(12) United States Patent
Calomeni et al.

(10) Patent No.: US 12,447,328 B2
(45) Date of Patent: Oct. 21, 2025

(54) INTRAVASCULAR BLOOD PUMPS AND METHODS OF MANUFACTURE AND USE

(71) Applicant: Shifamed Holdings, LLC, Campbell, CA (US)

(72) Inventors: Michael Calomeni, San Jose, CA (US); Brian D. Brandt, Morgan Hill, CA (US); Daniel Hildebrand, Santa Cruz, CA (US); Tom Saul, Portland, OR (US)

(73) Assignee: Shifamed Holdings, LLC, Campbell, CA (US)

( * ) Notice: Subject to any disclaimer, the term of this patent is extended or adjusted under 35 U.S.C. 154(b) by 0 days.

(21) Appl. No.: 18/614,131

(22) Filed: Mar. 22, 2024

(65) Prior Publication Data
US 2025/0050093 A1 Feb. 13, 2025

Related U.S. Application Data

(63) Continuation of application No. 16/927,705, filed on Jul. 13, 2020, now Pat. No. 11,964,145.

(60) Provisional application No. 62/881,176, filed on Jul. 31, 2019, provisional application No. 62/873,722, filed on Jul. 12, 2019, provisional application No. 62/873,736, filed on Jul. 12, 2019.

(51) Int. Cl.
| | | |
|---|---|---|
| *A61M 60/857* | (2021.01) | |
| *A61M 60/13* | (2021.01) | |
| *A61M 60/139* | (2021.01) | |
| *A61M 60/174* | (2021.01) | |
| *A61M 60/216* | (2021.01) | |
| *A61M 60/295* | (2021.01) | |
| *A61M 60/414* | (2021.01) | |
| *A61M 60/808* | (2021.01) | |
| *A61M 60/81* | (2021.01) | |

(52) U.S. Cl.
CPC .......... *A61M 60/857* (2021.01); *A61M 60/13* (2021.01); *A61M 60/139* (2021.01); *A61M 60/174* (2021.01); *A61M 60/216* (2021.01); *A61M 60/295* (2021.01); *A61M 60/414* (2021.01); *A61M 60/808* (2021.01); *A61M 60/81* (2021.01); *A61M 2207/00* (2013.01); *A61M 2230/30* (2013.01)

(58) Field of Classification Search
None
See application file for complete search history.

(56) References Cited

U.S. PATENT DOCUMENTS

| | | |
|---|---|---|
| 4,625,712 A | 12/1986 | Wampler |
| 4,753,221 A | 6/1988 | Kensey et al. |

(Continued)

FOREIGN PATENT DOCUMENTS

| | | |
|---|---|---|
| CA | 3014105 A1 | 8/2017 |
| EP | 3131599 A1 | 2/2017 |

(Continued)

*Primary Examiner* — Jon Eric C Morales
(74) *Attorney, Agent, or Firm* — Shay Glenn LLP

(57) ABSTRACT

Catheter blood pump that include an expandable pump portion extending distally from an elongate shaft. The pump portions include an expandable impeller housing including an expandable blood conduit that defines a blood lumen between an inflow and an outflow. The pump portions include one or more expandable impellers disposed at least partially within the blood lumen.

28 Claims, 23 Drawing Sheets

(56) References Cited

U.S. PATENT DOCUMENTS

| | | |
|---|---|---|
| 4,961,738 A | 10/1990 | Mackin |
| 5,061,256 A | 10/1991 | Wampler |
| 5,287,858 A | 2/1994 | Hammerslag et al. |
| 5,507,629 A | 4/1996 | Jarvik |
| 5,735,892 A | 4/1998 | Myers et al. |
| 6,007,478 A | 12/1999 | Siess et al. |
| 6,053,943 A | 4/2000 | Edwin et al. |
| 6,685,696 B2 | 2/2004 | Fleischhacker et al. |
| 6,712,844 B2 | 3/2004 | Pacetti |
| 7,022,100 B1 | 4/2006 | Hosn et al. |
| 7,027,875 B2 | 4/2006 | Siess et al. |
| 7,220,275 B2 | 5/2007 | Davidson et al. |
| 7,828,710 B2 | 11/2010 | Shifflette |
| 8,241,199 B2 | 8/2012 | Maschke |
| 8,388,565 B2 | 3/2013 | Shifflette |
| 8,485,961 B2 | 7/2013 | Campbell et al. |
| 8,535,211 B2 | 9/2013 | Campbell et al. |
| 8,591,393 B2 | 11/2013 | Walters et al. |
| 8,597,170 B2 | 12/2013 | Walters et al. |
| 8,721,517 B2 | 5/2014 | Zeng et al. |
| 8,734,508 B2 | 5/2014 | Hastings et al. |
| 8,814,776 B2 | 8/2014 | Hastie et al. |
| 8,814,933 B2 | 8/2014 | Siess |
| 8,849,398 B2 | 9/2014 | Evans |
| 8,932,141 B2 | 1/2015 | Liebing |
| 8,934,956 B2 | 1/2015 | Glenn et al. |
| 9,028,216 B2 | 5/2015 | Schumacher et al. |
| 9,028,392 B2 | 5/2015 | Shifflette |
| 9,072,825 B2 | 7/2015 | Pfeffer et al. |
| 9,138,518 B2 | 9/2015 | Campbell et al. |
| 9,180,235 B2 | 11/2015 | Forsell |
| 9,358,330 B2 | 6/2016 | Schumacher |
| 9,446,179 B2 | 9/2016 | Keenan et al. |
| 9,512,839 B2 | 12/2016 | Liebing |
| 9,669,142 B2 | 6/2017 | Spanier et al. |
| 9,833,550 B2 | 12/2017 | Siess |
| 9,872,948 B2 | 1/2018 | Siess |
| 10,029,037 B2 | 7/2018 | Muller et al. |
| 10,052,419 B2 | 8/2018 | Er |
| 10,208,763 B2 | 2/2019 | Schumacher et al. |
| 10,357,598 B2 | 7/2019 | Aboul-Hosn et al. |
| 10,363,349 B2 * | 7/2019 | Muller ................ A61M 60/17 |
| 10,681,770 B2 * | 6/2020 | Kim .......................... H04L 1/00 |
| 10,881,770 B2 | 1/2021 | Tuval et al. |
| 10,894,115 B2 | 1/2021 | Pfeffer et al. |
| 11,268,521 B2 | 3/2022 | Toellner |
| 11,280,345 B2 | 3/2022 | Bredenbreuker et al. |
| 11,850,413 B2 | 12/2023 | Zeng et al. |
| 11,964,145 B2 | 4/2024 | Calomeni et al. |
| 12,017,056 B2 | 6/2024 | Guo et al. |
| 2002/0072679 A1 | 6/2002 | Schock et al. |
| 2002/0072779 A1 | 6/2002 | Loeb |
| 2005/0277803 A1 | 12/2005 | Pecor |
| 2007/0250148 A1 | 10/2007 | Perry et al. |
| 2014/0148638 A1 | 5/2014 | LaRose et al. |
| 2015/0238671 A1 | 8/2015 | Mesallum |
| 2015/0328382 A1 | 11/2015 | Corbett et al. |
| 2016/0022890 A1 | 1/2016 | Schwammenthal et al. |
| 2016/0053763 A1 | 2/2016 | Toellner |
| 2017/0014562 A1 | 1/2017 | Liebing |
| 2017/0037860 A1 | 2/2017 | Toellner |
| 2017/0100527 A1 | 4/2017 | Schwammenthal et al. |
| 2017/0173242 A1 | 6/2017 | Anderson et al. |
| 2017/0232169 A1 | 8/2017 | Muller |
| 2017/0340788 A1 | 11/2017 | Korakianitis et al. |
| 2018/0080326 A1 | 3/2018 | Schumacher et al. |
| 2018/0149164 A1 | 5/2018 | Siess |
| 2018/0169313 A1 | 6/2018 | Schwammenthal et al. |
| 2018/0303990 A1 | 10/2018 | Siess et al. |
| 2019/0083690 A1 | 3/2019 | Siess et al. |
| 2020/0121835 A1 | 4/2020 | Farago et al. |
| 2020/0237981 A1 | 7/2020 | Tuval et al. |
| 2020/0316268 A1 | 10/2020 | Antoni et al. |
| 2022/0203084 A1 | 6/2022 | Zarins et al. |

FOREIGN PATENT DOCUMENTS

| | | |
|---|---|---|
| EP | 3153190 A1 | 4/2017 |
| EP | 3000493 B1 | 5/2017 |
| JP | 2019508128 A | 3/2019 |
| WO | WO01/019444 A1 | 3/2001 |
| WO | WO2015/177793 A2 | 11/2015 |
| WO | WO2018/061002 A1 | 4/2018 |
| WO | WO2018/067410 A1 | 4/2018 |
| WO | WO2018/078615 A1 | 5/2018 |
| WO | WO2018/088939 A1 | 5/2018 |
| WO | WO2018/096531 A1 | 5/2018 |
| WO | WO2019/191851 A1 | 9/2019 |
| WO | WO2019/194956 A1 | 10/2019 |
| WO | WO2019/229222 A1 | 12/2019 |

* cited by examiner

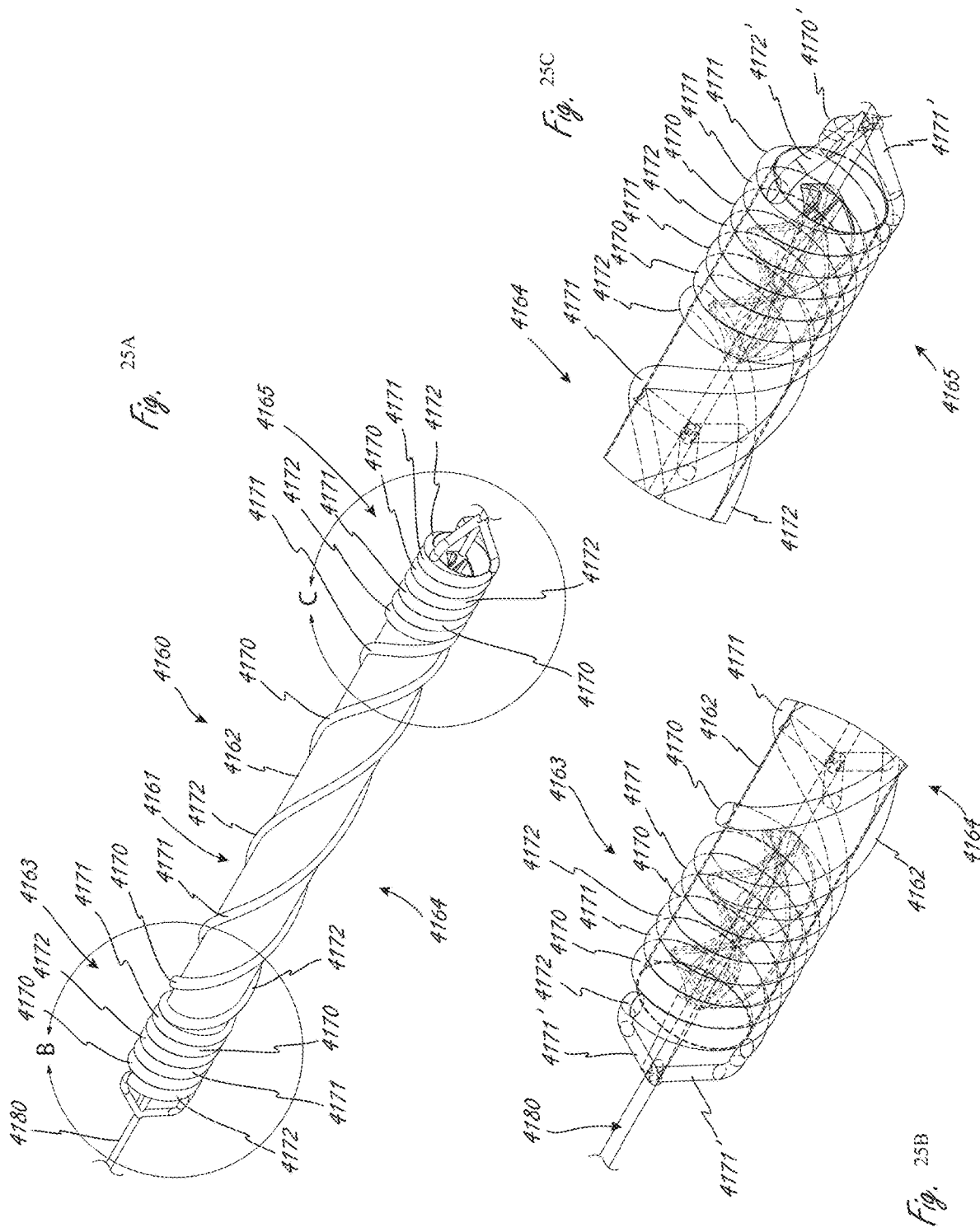

INTRAVASCULAR BLOOD PUMPS AND METHODS OF MANUFACTURE AND USE

INCORPORATION BY REFERENCE

This application is a continuation of U.S. patent application Ser. No. 16/927,705, filed Jul. 13, 2020, which claims the benefit of U.S. Provisional Application No. 62/873,722, filed Jul. 12, 2019; U.S. Provisional Application No. 62/873,736, filed Jul. 12, 2019; and U.S. Provisional Application No. 62/881,176, filed Jul. 31, 2019, all of which are incorporated by reference herein for all purposes.

This application is related to and incorporates by reference herein the disclosures of the following applications for all purposes: WO2018/226991, WO2019/094963, WO2019/152875, and WO2020/028537.

All publications and patent applications mentioned in this specification are herein incorporated by reference to the same extent as if each individual publication or patent application was specifically and individually indicated to be incorporated by reference.

BACKGROUND

Patients with heart disease can have severely compromised ability to drive blood flow through the heart and vasculature, presenting for example substantial risks during corrective procedures such as balloon angioplasty and stent delivery. There is a need for ways to improve the volume or stability of cardiac outflow for these patients, especially during corrective procedures.

Intra-aortic balloon pumps (IABP) are commonly used to support circulatory function, such as treating heart failure patients. Use of IABPs is common for treatment of heart failure patients, such as supporting a patient during high-risk percutaneous coronary intervention (HRPCI), stabilizing patient blood flow after cardiogenic shock, treating a patient associated with acute myocardial infarction (AMI) or treating decompensated heart failure. Such circulatory support may be used alone or in with pharmacological treatment.

An IABP commonly works by being placed within the aorta and being inflated and deflated in counterpulsation fashion with the heart contractions, and one of the functions is to attempt to provide additive support to the circulatory system.

More recently, minimally-invasive rotary blood pumps have been developed that can be inserted into the body in connection with the cardiovascular system, such as pumping arterial blood from the left ventricle into the aorta to add to the native blood pumping ability of the left side of the patient's heart. Another known method is to pump venous blood from the right ventricle to the pulmonary artery to add to the native blood pumping ability of the right side of the patient's heart. An overall goal is to reduce the workload on the patient's heart muscle to stabilize the patient, such as during a medical procedure that may put additional stress on the heart, to stabilize the patient prior to heart transplant, or for continuing support of the patient.

The smallest rotary blood pumps currently available can be percutaneously inserted into the vasculature of a patient through an access sheath, thereby not requiring surgical intervention, or through a vascular access graft. A description of this type of device is a percutaneously-inserted ventricular support device.

There is a need to provide additional improvements to the field of ventricular support devices and similar blood pumps for treating compromised cardiac blood flow.

SUMMARY OF THE DISCLOSURE

One aspect of the disclosure is a catheter blood pump, comprising an expandable pump portion extending distally from an elongate shaft, the pump portion including an expandable impeller housing including an expandable blood conduit that defines a blood lumen between an inflow and an outflow, one or more expandable impellers, each of which are disposed at least partially within the blood lumen, a sensor wire secured to the expandable impeller housing and extending from a proximal end of the expandable impeller housing to a distal end of the expandable impeller housing, and a sensor coupled to the sensor wire, the sensor disposed distal to a distal end of the expandable blood conduit.

In this aspect, the sensor wire may be secured to the expandable impeller housing such that it is disposed radially outside of the expandable blood conduit.

In this aspect, a sensor wire may be fixed relative to the expandable impeller housing such that it does not float within a sensor wire lumen.

In this aspect, the sensor wire may be disposed within a sensor wire lumen, the sensor wire having a size relative to the sensor wire lumen such that it floats in the sensor wire lumen. A sensor wire lumen may be defined by an inner surface of an elongate hollow shaft, the elongate hollow shaft may be secured to the expandable impeller housing. The elongate hollow shaft has a circular cross sectional configuration. The catheter blood pump may further comprise an overlay disposed about the elongate hollow shaft, the overlay positioned to secure the elongate hollow shaft to the expandable impeller housing. An overlay may comprise one or more types of material that are different than a material of an elongate hollow shaft. An overlay material may have at least one property that is different than a component of the expandable impeller housing that is radially within and adjacent to the elongate hollow shaft. A radially inner component may be stiffer, or less stiff, than an overlay. A radially inner component may comprise a membrane of the expandable impeller housing.

In this aspect, a sensor wire lumen may be defined by one of more polymeric materials.

In this aspect, a sensor wire lumen may have a radially outer surface defined by an overlay.

In this aspect, a sensor wire lumen may have a radially inner surface that is defined by an overlay, or by a component of the expandable impeller housing, such as a membrane.

In this aspect, a sensor wire lumen may be at least partially defined by a protrusion that protrudes radially outward from a generally circular cross sectional profile of the expandable impeller housing.

In this aspect, the sensor wire may extend in a helical configuration about at least a portion of the expandable impeller housing, optionally along an entire length of the expandable impeller housing.

In this aspect, the sensor wire may extend in a linear configuration along at least a portion of the expandable impeller housing, optionally along an entire length of the expandable impeller housing.

In this aspect, the sensor wire may extend in a helical configuration about a portion of the expandable impeller housing and in a linear configuration along at least a portion of the expandable impeller housing.

In this aspect, the sensor wire, may extend proximally from the expandable impeller housing and may be in communication with a proximal region of the blood pump that is positioned to remain outside of a patient when the impeller is operated. In this aspect, the sensor wire may be a fiber optic.

In this aspect, the sensor may be secured to an expandable distal strut at a pump inflow, the distal strut extending distally relative to a distal end of the expandable blood conduit.

In this aspect, the sensor may be secured to a radially outer surface of the expandable distal strut.

In this aspect, the sensor wire may also be secured to the distal strut proximal to the sensor. The sensor wire may be linearly aligned with a distal strut.

In this aspect, a sensor wire lumen may be secured to a distal strut proximal to the sensor, the sensor wire disposed within the sensor wire lumen.

In this aspect, the sensor wire may be secured to a proximal expandable strut, the proximal strut extending proximally from a proximal end of the blood conduit. The sensor wire may follow the configuration of the proximal strut.

This aspect may further comprise a sensor wire lumen in which the sensor wire is disposed, wherein the sensor wire lumen may be secured to a proximal expandable strut, and optionally wherein the sensor wire lumen follows the configuration of the proximal strut.

In this aspect, the expandable impeller housing may include one or more scaffold sections.

In this aspect, the expandable impeller housing may be stiffer in proximal and distal impeller sections than in a central section in between the distal and proximal impeller sections. The blood pump may further include a distal impeller within the distal impeller section and a proximal impeller in the proximal impeller section.

In this aspect, the sensor may be secured such that a pressure sensitive area is optionally between 1 and 89 degrees relative to a longitudinal axis, such as from 5-85 degrees, such as from 10-80 degrees.

In this aspect, the sensor wire may be secured to the expandable impeller housing but is moveable to some extent relative thereto, even if the sensor wire is fixed relative to the expandable impeller housing.

In this aspect, a sensor wire lumen may be in fluid communication with an inflation fluid source such that the sensor wire lumen is inflatable, and wherein the inflatable sensor wire lumen may have a closed distal end.

One aspect of this disclosure is a method of manufacturing a pump portion of an intravascular blood pump, comprising: creating a tubular substrate layer, the tubular substrate layer directly or indirectly defining at least a portion of a blood lumen of the pump portion; positioning an elongate hollow shaft on and extending along at least a portion of the tubular substrate layer; and depositing an overlay on the elongate shaft, optionally along substantially its entire length.

In this aspect, creating a tubular substrate layer may comprise depositing a softened polymeric material on a mandrel and allowing it to cool.

In this aspect, positioning an elongate hollow shaft on and extending along at least a portion of the tubular substrate layer comprises positioning the elongate hollow shaft such that is has one or more linear sections, optionally wherein it also has one or more helical sections.

In this aspect, depositing an overlay may comprise depositing a softened thermoplastic material on the elongate hollow shaft.

This aspect may further include positioning a sensor wire radially outside of the substrate, optionally radially within an overlay.

This aspect may include removing an elongate hollow shaft after an overlay has been deposited to thereby create a sensor wire lumen.

This aspect may further include removing a elongate hollow shaft prior to positioning a sensor wire radially within an overlay.

In this aspect, positioning the sensor wire may comprise positioning the sensor wire within an elongate hollow shaft.

This aspect may further include securing a sensor to the pump portion, the sensor coupled to the sensor wire. Securing a sensor may comprise securing the sensor to a strut, such as one or both of a proximal strut or a distal strut that extends axially from an end of a blood conduit.

This aspect may further comprise securing a sensor wire lumen to one or both of a proximal strut or a distal strut, the struts extending axially from a blood conduit.

This aspect may further comprise securing a second sensor to the blood pump, the second sensor disposed at or near an outflow of the pump portion.

This aspect may further include securing the tubular substrate layer to one or more of any of the expandable scaffolds or expandable members herein, any of which may provide radial support to a blood conduit.

One aspect of this disclosure is a catheter blood pump, comprising: an expandable pump portion extending distally from an elongate shaft, the pump portion including an expandable impeller housing including an expandable blood conduit that defines a blood lumen between an inflow and an outflow, and an inflatable in fluid communication with a fluid pathway extending proximally from the expandable impeller housing, the inflatable positioned and configured to provide radial support to the blood conduit when the inflatable is inflated; and one or more expandable impellers, each of which are disposed at least partially within the blood lumen adapted to move blood through the blood conduit.

This aspect may further include a fluid source proximally spaced from the expandable housing such that the fluid source remains outside of the body when the expandable housing is at the target location, the fluid source in fluid communication with the fluid pathway. A fluid source herein may be adapted to deliver fluid therefrom one or both of manually or automatically.

In this aspect the blood conduit may be adapted and configured such that inflation of the inflatable at least partially expands the blood conduit.

In this aspect, the inflatable may be configured and positioned relative to the blood conduit such that, when inflated, the inflatable provides more radial support to the blood conduit at the location of the one or more impellers than at a region of the blood conduit adjacent to the one or more impellers.

In this aspect, the expandable impeller housing may comprise more than one inflatable, and wherein the more than one inflatable may be configured and positioned relative to the blood conduit such that, when inflated, the more than one inflatable provide more radial support to the blood conduit at the location of the one or more impellers than at a region of the blood conduit adjacent to the one or more impellers. An adjacent region may be a central region of the expandable impeller housing, and is optionally between impeller regions.

In this aspect, an inflatable may comprise an annular configuration in at least a section of the inflatable. An inflatable may have more than one annular sections axially spaced apart.

One aspect of the disclosure is a method of deploying a pump portion of a catheter blood pump within a body of a subject, comprising: exposing an expandable impeller housing from within a delivery device, the expandable impeller housing including an expandable blood conduit and an inflatable disposed along at least a portion of the expandable blood conduit; exposing an impeller from within the delivery device so that the impeller is at least partially within the blood conduit, optionally causing the impeller to at least partially expand; delivering fluid from a fluid source that is disposed outside of the body of the subject, along an inflation pathway and into the inflatable; inflating the inflatable; and radially supporting the blood conduit with the inflated inflatable.

BRIEF DESCRIPTION OF THE DRAWINGS

FIG. 25A is a perspective view of an expanded pump portion that includes one or more inflatables.

FIG. 25B illustrates a proximal region of the pump portion in FIG. 25A.

FIG. 25C illustrates a distal region of the pump portion in FIG. 25A.

DETAILED DESCRIPTION

The present disclosure is related to medical devices, systems, and methods of use and manufacture. Medical devices herein may include a pump portion (which may also be referred to herein as a working portion) adapted to be disposed within a physiologic vessel, wherein the pump portion includes one or more components configured to act upon fluid. For example, pump portions herein may include one or more rotating members that when rotated, facilitate the movement of a fluid such as blood through a blood lumen defined by an impeller housing.

Any of the disclosure herein relating to an aspect of a system, device, or method of use or manufacture may be incorporated with any other suitable disclosure herein. For example, a figure describing only one aspect of a device or method may be included with different embodiments even if that is not specifically stated in a description of one or both parts of the disclosure. It is thus understood that combinations of different portions of this disclosure are included herein unless specifically indicated otherwise.

Figure 1:
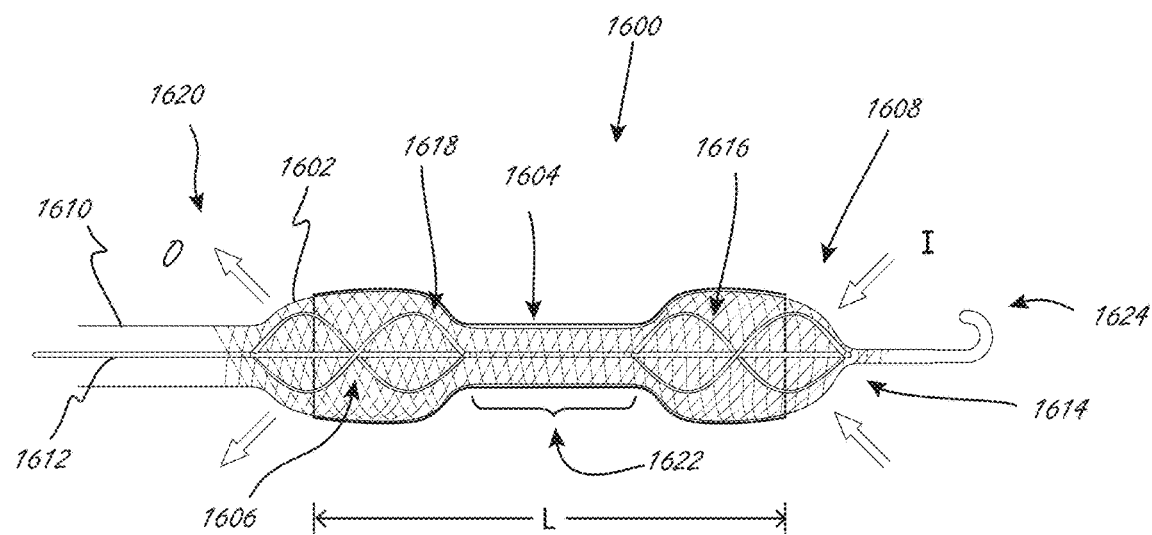
FIG. 1 is a side view of an exemplary expandable pump portion that includes an expandable impeller housing, blood conduit and a plurality of impellers.

FIG. 1 is a side view illustrating a distal portion of an exemplary catheter blood pump, including expandable pump portion 1600. Pump portion 1600 includes proximal impeller 1606 and distal impeller 1616, both of which are in operable communication with drive mechanism 1612. Pump portion 1600 is shown in an expanded configuration in FIG. 1, and is adapted to be collapsed to a delivery configuration so that it can be delivered with a lower delivery profile. The impellers may be attached to drive mechanism 1612. Drive mechanism 1612 (e.g., drive cable) is in operable communication with an external motor, not shown, and extends through elongate shaft 1610. The phrases "pump portion" and "working portion" (or derivatives thereof) may be used herein interchangeably herein unless indicated to the contrary. For example, without limitation, any of the working portions herein are understood to be pump portions.

Pump portion 1600 also includes expandable support member 1602, which in this embodiment has a proximal end 1620 that extends further proximally than a proximal end of proximal impeller 1606, and a distal end 1608 that extends further distally than a distal end 1614 of distal impeller 1616. Expandable member 1602 is disposed radially outside of the impellers along the axial length of the impellers. Expandable member 1602 can be constructed in a manner and made from materials similar to many types of expandable structures that are known in the medical arts to be able to be collapsed and expanded, examples of which are provided herein. Examples of suitable materials include, but are not limited to, polyurethane and polyurethane elastomers.

Pump portion 1600 also includes expandable blood conduit 1604, which is coupled to expandable member 1602, has a length L, and extends axially between the impellers. Blood conduits herein may simply be referred to as conduits. Conduit 1604 creates and provides a blood lumen between the two impellers. When in use, blood moves through the lumen defined by conduit 1604. The conduits herein may be non-permeable, or they may be semi-permeable, or even porous as long as they can still define a lumen. The conduits herein are also flexible, unless it is otherwise indicated. The conduits herein extend completely around (i.e., 360 degrees) at least a portion of the pump portion. In pump portion 1600, conduit extends completely around expandable member 1602, but does not extend all the way to the proximal end 1602 or distal end 1608 of expandable member 1602. The structure of the expandable member creates at least one inlet aperture to allow for inflow "I." and at least one outflow aperture to allow for outflow "O." Conduit 1604 improves impeller pumping dynamics, compared to a similar pump portion 1600 without the conduit.

Expandable support member 1602 may have a variety of constructions, and made from a variety of materials. For example, expandable member 1602 may be formed similar to expandable stents or stent-like devices, or any other example provided herein. For example, without limitation, expandable member 1602 could have an open-braided construction, such as a 24-end braid, although more or fewer braid wires could be used. Exemplary materials for the expandable member include nitinol, cobalt alloys, and polymers, although other materials could be used. Expandable member 1602 has an expanded configuration, as shown, in which the outer dimension (measured orthogonally relative a longitudinal axis of the working portion) of the expandable member is greater in at least a region where it is disposed radially outside of the impellers than in a central region 1622 of the expandable member that extends axially between the impeller. Drive cable 1612 is co-axial with the longitudinal axis in this embodiment. In use, the central region can be placed across a valve, such as an aortic valve. In some embodiments, expandable member 1602 is adapted and constructed to expand to an outermost dimension of 12-24F (4.0-8.0 mm) where the impellers are axially within the expandable member, and to an outermost dimension of 10-20F (3.3-6.7 mm) in central region 1622 between the impellers. The smaller central region outer dimension can reduce forces acting on the valve, which can reduce or minimize damage to the valve. The larger dimensions of the expandable member in the regions of the impellers can help stabilize the working portion axially when in use. Expandable member 1602 has a general dumbbell configuration. Expandable member 1602 has an outer configuration that tapers as it transitions from the impeller regions to central region 1622, and again tapers at the distal and proximal ends of expandable member 1602.

Expandable member 1602 has a proximal end 1620 that is coupled to shaft 1610, and a distal end 1608 that is coupled to distal tip 1624. The impellers and drive cable 1612 rotate within the expandable member and conduit assembly. Drive cable 1612 is axially stabilized with respect to distal tip 1624, but is free to rotate with respect to tip 1624.

In some embodiments, expandable member 1602 can be collapsed by pulling tension from end-to-end on the expandable member. This may include linear motion (such as, for example without limitation, 5-20 mm of travel) to axially extend expandable member 1602 to a collapsed configuration with collapsed outer dimension(s). Expandable member 1602 can also be collapsed by pushing an outer shaft such as a sheath over the expandable member/conduit assembly, causing the expandable member and conduit to collapse towards their collapsed delivery configuration.

Impellers 1606 and 1616 are also adapted and constructed such that one or more blades will stretch or radially compress to a reduced outermost dimension (measured orthogonally to the longitudinal axis of the working portion). For example without limitation, any of the impellers herein can include one or more blades made from a plastic formulation with spring characteristics, such as any of the impellers described in U.S. Pat. No. 7,393,181, the disclosure of which is incorporated by reference herein for all purposes and can be incorporated into embodiments herein unless this disclosure indicates to the contrary. Alternatively, for example, one or more collapsible impellers can comprise a superelastic wire frame, with polymer or other material that acts as a webbing across the wire frame, such as those described in U.S. Pat. No. 6,533,716, the disclosure of which is incorporated by reference herein for all purposes.

The inflow and/or outflow configurations of pump portion 1600 can be mostly axial in nature.

Exemplary sheathing and unsheathing techniques and concepts to collapse and expand medical devices are known, such as, for example, those described and shown in U.S. Pat. No. 7,841,976 or U.S. Pat. No. 8,052,749, the disclosures of which are incorporated by reference herein.

Figure 2:
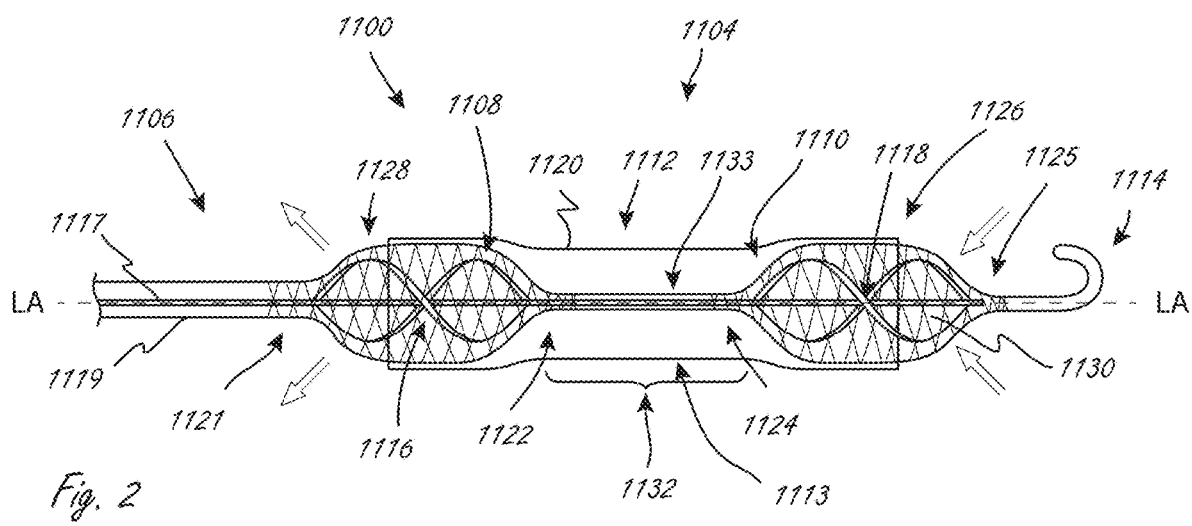
FIG. 2 is a side view of an exemplary expandable pump portion that includes an expandable impeller housing, a blood conduit, a plurality of impellers, and a plurality of expandable support members.

FIG. 2 is a side view illustrating a deployed configuration (shown extracorporally) of a distal portion of an exemplary embodiment of a catheter blood pump. Exemplary blood pump 1100 includes expandable pump portion 1104 and an elongate portion 1106 extending proximally from pump portion 1104. Elongate portion 1106 can extend to a more proximal region of the system, not shown for clarity, and that can include, for example, a motor that causes the rotation of the one or more impellers. Pump portion 1104 includes first expandable member 1108 and second expandable member 1110, axially spaced apart along a longitudinal axis LA of pump portion 1104. Spaced axially in this context refers to the entire first expandable member being axially spaced from the entire second expandable member along a longitudinal axis LA of pump portion 1104. A first end 1122 of first expandable member 1108 is axially spaced from a first end 1124 of second expandable member 1110.

First and second expandable members 1108 and 1110 generally each include a plurality of elongate segments disposed relative to one another to define a plurality of apertures 1130, only one of which is labeled in the second expandable member 1110. The expandable members can have a wide variety of configurations and can be constructed in a wide variety of ways, such as any of the configurations or constructions in, for example without limitation, U.S. Pat. No. 7,841,976, or the tube in 6,533,716, which is described as a self-expanding metal endoprosthetic material. For example, without limitation, one or both of the expandable members can have a braided construction or can be at least partially formed by laser cutting a tubular element.

Pump portion 1104 also includes expandable blood conduit 1112 that is coupled to first expandable support member 1108 and to second expandable support member 1110, and extends axially in between first expandable member 1108 and second expandable member 1110 in the deployed configuration. A central region 1113 of conduit 1112 spans an axial distance 1132 where the pump portion is void of first and second expandable members 1108 and 1110. Central region 1113 can be considered to be axially in between the expandable members. Distal end 1126 of conduit 1112 does not extend as far distally as a distal end 1125 of second expandable member 1110, and proximal end of conduit 1128 does not extend as far proximally as proximal end 1121 of first expandable member 1108.

When the disclosure herein refers to a conduit being coupled to an expandable member, the term coupled in this context does not require that the conduit be directly attached to the expandable member so that conduit physically contacts the expandable member. Even if not directly attached, however, the term coupled in this context refers to the conduit and the expandable member being joined together such that as the expandable member expands or collapses, the conduit also begins to transition to a different configuration and/or size. Coupled in this context therefore refers to conduits that will move when the expandable member to which it is coupled transitions between expanded and collapsed configurations. In some descriptions, conduits may be described as including one or more expandable support members.

Any of the conduits herein may be deformable to some extent, allowing them to be collapsed for delivery to a target location. For example, conduit 1112 includes elongate member 1120 that may be made of one or more materials that allow the central region 1113 of conduit to deform to some extent radially inward (towards LA) in response to, for example and when in use, forces from valve tissue (e.g., leaflets) or a replacement valve as working portion 1104 is deployed towards the configuration shown in FIG. 2. The conduit may be stretched tightly between the expandable members in some embodiments. The conduit may alternatively be designed with a looseness that causes a greater degree of compliance. This can be desirable when the working portion is disposed across fragile structures such as an aortic valve, which may allow the valve to compress the conduit in a way that minimizes point stresses in the valve. In some embodiments, the conduit may include a membrane attached to the proximal and distal expandable members. Exemplary materials that can be used for any conduits herein include, without limitations, polyurethane rubber, silicone rubber, acrylic rubber, expanded polytetrafluoroethylene, polyethylene, polyethylene terephthalate, including any combination thereof.

Any of the conduits herein can have a thickness of, for example, 0.5-20 thousandths of an inch (thou), such as 1-15 thou, or 1.5 to 15 thou, 1.5 to 10 thou, or 2 to 10 thou.

Any of the conduits herein, or at least a portion of the conduit, can be impermeable to blood. In FIG. 2, pump portion 1104 includes a lumen that extends from distal end 1126 of conduit 1112 and extends to proximal end 1128 of conduit 1112. The lumen is defined by conduit 1112 in central region 1113, but can be thought of being defined by both the conduit and portions of the expandable members in regions axially adjacent to central region 1113. In this embodiment, however, it is the conduit material that causes the lumen to exist and prevents blood from passing through the conduit.

Any of the conduits herein that are secured to one or more expandable members can be, unless indicated to the contrary, secured so that the conduit is disposed radially outside of one or more expandable members, radially inside of one or more expandable members, or both, and the expandable member can be impregnated with the conduit material.

In some embodiments that include more than one expandable support member, proximal and distal expandable members provide radial support and maintain the conduit in an open configuration to create the blood lumen, while each also creates a working environment for an impeller, described below. Each of the expandable members, when in the deployed configuration, is maintained in a spaced relationship relative to a respective impeller, which allows the impeller to rotate within the expandable member without contacting the expandable member. Pump portion 1104 includes first impeller 1116 and second impeller 1118, with first impeller 1116 disposed radially within first expandable member 1108 and second impeller 1118 disposed radially within second expandable member 1110. In this embodiment, the two impellers even though they are distinct and separate impellers, are in operable communication with a common drive mechanism (e.g., drive cable 1117), such that when the drive mechanism is activated the two impellers rotate together. In this deployed configuration, impellers 1116 and 1118 are axially spaced apart along longitudinal axis LA, just as are the expandable members 1108 and 1110 are axially spaced apart.

Impellers 1116 and 1118 are also axially within the ends of expandable members 1108 and 1110, respectively (in addition to being radially within expandable members 1108 and 1110). The impellers herein can be considered to be axially within an expandable member even if the expandable member includes struts extending from a central region of the expandable member towards a longitudinal axis of the working portion (e.g., tapering struts in a side view). In FIG. 2, second expandable member 1110 extends from first end 1124 (proximal end) to second end 1125 (distal end).

In FIG. 2, a distal portion of impeller 1118 extends distally beyond distal end 1126 of conduit 1112, and a proximal portion of impeller 1116 extends proximally beyond proximal end 1128 of conduit 1112. In this figure, portions of each impeller are axially within the conduit in this deployed configuration.

In the exemplary embodiment shown in FIG. 2, impellers 1116 and 1118 are in operable communication with a common drive mechanism 1117, and in this embodiment, the impellers are each coupled to drive mechanism 1117, which extends through shaft 1119 and working portion 1104. Drive mechanism 1117 can be, for example, an elongate drive cable, which when rotated causes the impellers to rotate. In this example, as shown, drive mechanism 1117 extends to and is axially fixed relative to distal tip 1114, although it is adapted to rotate relative to distal tip 1114 when actuated. Thus, in this embodiment, the impellers and drive mechanism 1117 rotate together when the drive mechanism is rotated. Any number of known mechanisms can be used to rotate drive mechanism, such as with a motor (e.g., an external motor).

The expandable members and the conduit are not in rotational operable communication with the impellers and the drive mechanism. In this embodiment, proximal end 1121 of proximal expandable member 1108 is coupled to shaft 1119, which may be a shaft of elongate portion 1106 (e.g., an outer catheter shaft). Distal end 1122 of proximal expandable member 1108 is coupled to central tubular member 1133, through which drive mechanism 1117 extends. Central tubular member 1133 extends distally from proximal expandable member 1108 within conduit 1112 and is also coupled to proximal end 1124 of distal expandable member 1110. Drive mechanism 1117 thus rotates within and relative to central tubular member 1133. Central tubular member 1133 extends axially from proximal expandable member 1108 to distal expandable member 1110. Distal end 1125 of distal expandable member 1110 is coupled to distal tip 1114, as shown. Drive mechanism 1117 is adapted to rotate relative to tip 1114, but is axially fixed relative to tip 1114.

Working portion 1104 is adapted and configured to be collapsed to a smaller profile than its deployed configuration (which is shown in FIG. 2). This allows it to be delivered using a lower profile delivery device (smaller French size) than would be required if none of working portion 1104 was collapsible. Even if not specifically stated herein, any of the expandable members and impellers may be adapted and configured to be collapsible to some extent to a smaller delivery configuration.

The working portions herein can be collapsed to a collapsed delivery configuration using conventional techniques, such as with an outer sheath that is movable relative to the working portion (e.g., by axially moving one or both of the sheath and working portion). For example without limitation, any of the systems, devices, or methods shown in the following references may be used to facilitate the collapse of a working portions herein: U.S. Pat. No. 7,841,976 or U.S. Pat. No. 8,052,749, the disclosures of which are incorporated by reference herein for all purposes.

Figure 3A:
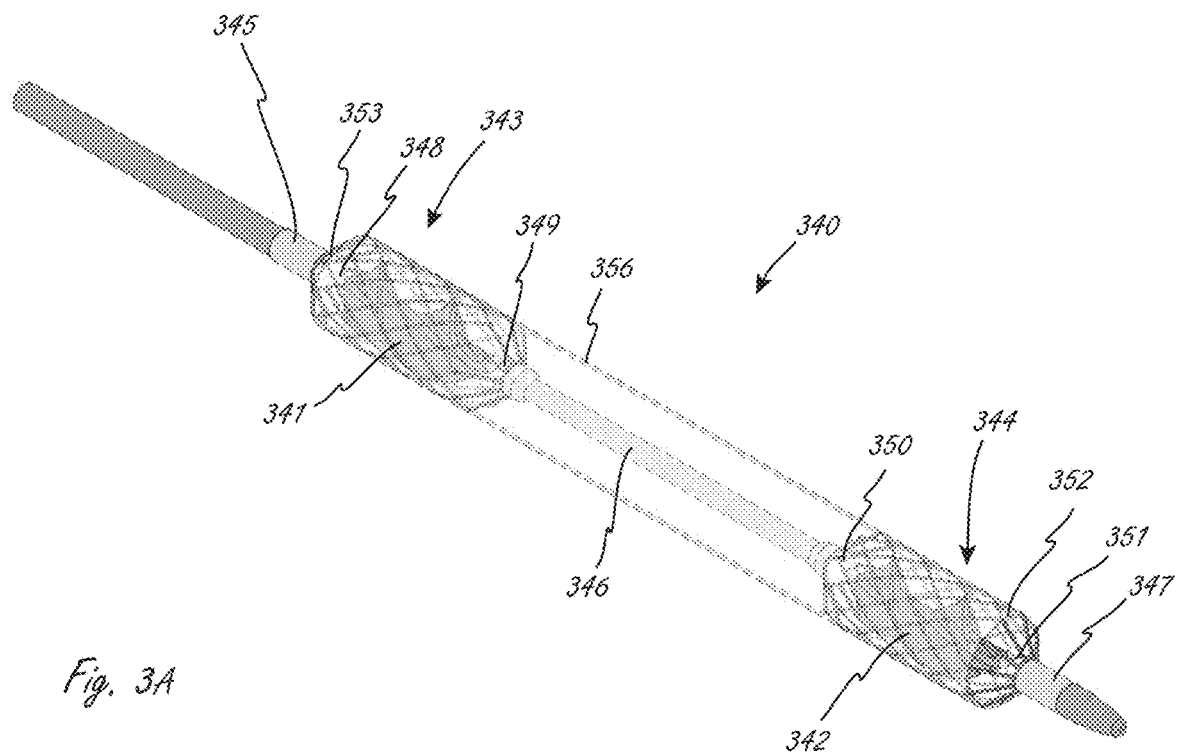
FIGS. 3A, 3B, 3C and 3D illustrate an exemplary expandable pump portion that includes a blood conduit, a plurality of impellers, and a plurality of expandable members.
Figure 3B:
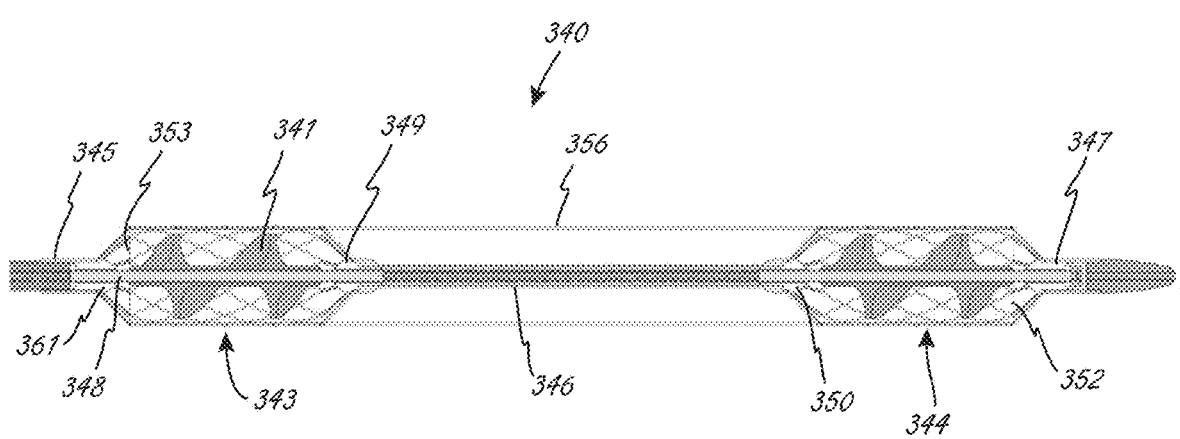
Figure 3C:
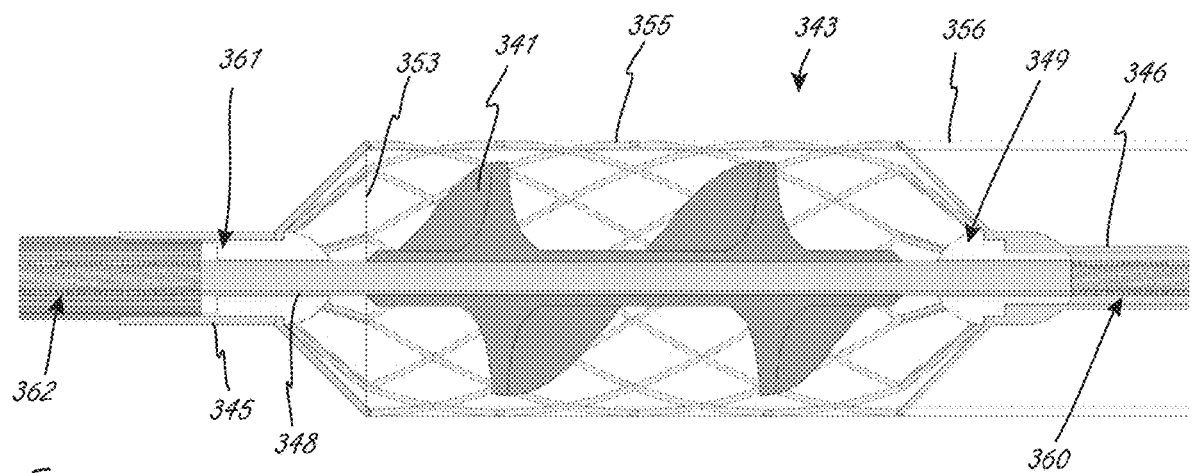
Figure 3D:
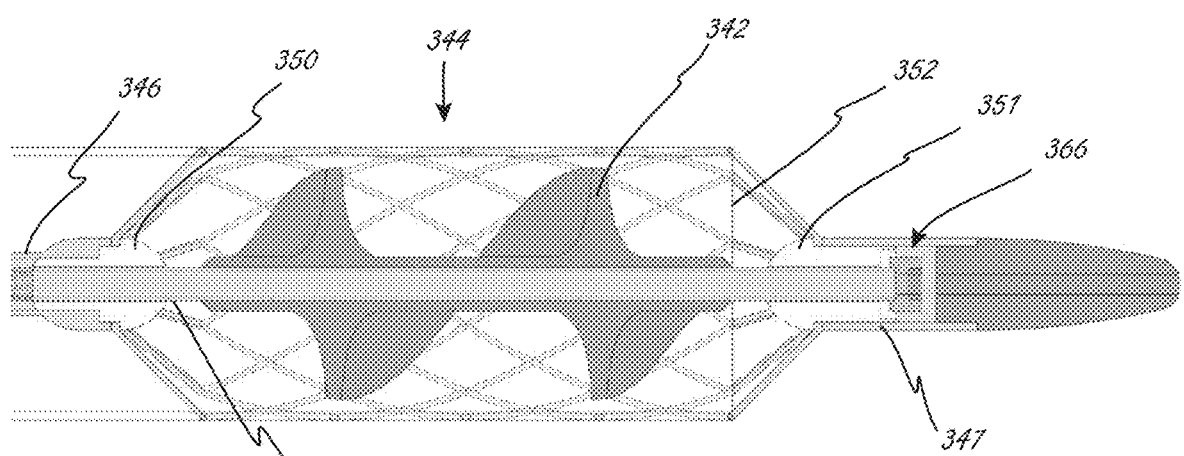

FIGS. 3A-3E show an exemplary working portion that is similar in some ways to the working portion shown in FIG. 2. Working portion 340 is similar to working portion 1104 in that in includes two expandable members axially spaced from one another when the working portion is expanded, and a conduit extending between the two expandable members. FIG. 3A is a perspective view, FIG. 3B is a side sectional view, and FIGS. 3C and 3D are close-up side sectional views of sections of the view in FIG. 3B.

Working portion 340 includes proximal impeller 341 and distal impeller 342, which are coupled to and in operational communication with a drive cable, which defines therein a lumen. The lumen can be sized to accommodate a guidewire, which can be used for delivery of the working portion to the desired location. The drive cable, in this embodiment, includes first section 362 (e.g., wound material), second section 348 (e.g., tubular member) to which proximal impeller 341 is coupled, third section 360 (e.g., wound material), and fourth section 365 (e.g., tubular material) to which distal impeller 342 is coupled. The drive cable sections all have the same inner diameter, so that lumen has a constant inner diameter. The drive cable sections can be secured to each other using known attachment techniques. A distal end of fourth section 365 extends to a distal region of the working portion, allowing the working portion to be, for example, advanced over a guidewire for positioning the working portion. In this embodiment the second and fourth sections can be stiffer than first and third sections. For example, second and fourth can be tubular and first and third sections can be wound material to impart less stiffness.

Working portion 340 includes proximal expandable member 343 and distal expandable member 344, each of which extends radially outside of one of the impellers. The expandable members have distal and proximal ends that also extend axially beyond distal and proximal ends of the impellers, which can be seen in FIGS. 3B-3D. Coupled to the two expandable members is conduit 356, which has a proximal end 353 and a distal end 352. The two expandable members each include a plurality of proximal struts and a plurality of distal struts. The proximal struts in proximal expandable member 343 extend to and are secured to shaft section 345, which is coupled to bearing 361, through which the drive cable extends and is configured and sized to rotate. The distal struts of proximal expandable member 343 extend to and are secured to a proximal region (to a proximal end in this case) of central tubular member 346, which is disposed axially in between the expandable members. The proximal end of central tubular member 346 is coupled to bearing 349, as shown in FIG. 3C, through which the drive cable extends and rotates. The proximal struts of distal expandable member 344 extend to and secured to a distal region (to a distal end in this case) of central tubular member 346. Bearing 350 is also coupled to the distal region of central tubular member 346, as is shown in FIG. 3D. The drive cable extends through and rotates relative to bearing 350. Distal struts of distal expandable member extend to and are secured to shaft section 347 (see FIG. 3A), which can be considered part of the distal tip. Shaft section 347 is coupled to bearing 351 (see FIG. 3D), through which the drive cable extends and rotates relative to. The distal tip also includes bearing 366 (see FIG. 3D), which can be a thrust bearing. Working portion 340 can be similar to or the same in some aspects to working portion 1104, even if not explicitly included in the description. In this embodiment, conduit 356 extends at least as far as ends of the impeller, unlike in working portion 1104. Either embodiment can be modified so that the conduit extends to a position as set forth in the other embodiment. In some embodiments, section 360 can be a tubular section instead of wound.

In alternative embodiments, at least a portion of any of the impellers herein may extend outside of the fluid lumen. For example, only a portion of an impeller may extend beyond an end of the fluid lumen in either the proximal or distal direction. In some embodiments, a portion of an impeller that extends outside of the fluid lumen is a proximal portion of the impeller, and includes a proximal end (e.g., see the proximal impeller in FIG. 2). In some embodiments, the portion of the impeller that extends outside of the fluid lumen is a distal portion of the impeller, and includes a distal end (e.g., see the distal impeller in FIG. 2). When the disclosure herein refers to impellers that extend outside of the fluid lumen (or beyond an end), it is meant to refer to relative axial positions of the components, which can be most easily seen in side views or top views, such as in FIG. 2.

A second impeller at another end of the fluid lumen may not, however, extend beyond the fluid lumen. For example, an illustrative alternative design can include a proximal impeller that extends proximally beyond a proximal end of the fluid lumen (like the proximal impeller in FIG. 2), and the fluid lumen does not extend distally beyond a distal end of a distal impeller (like in FIG. 3B). Alternatively, a distal end of a distal impeller can extend distally beyond a distal end of the fluid lumen, but a proximal end of a proximal impeller does not extend proximally beyond a proximal end of the fluid lumen. In any of the pump portions herein, none of the impellers may extend beyond ends of the fluid lumen.

While specific exemplary locations may be shown herein, the fluid pumps may be able to be used in a variety of locations within a body. Some exemplary locations for placement include placement in the vicinity of an aortic valve or pulmonary valve, such as spanning the valve and positioned on one or both sides of the valve, and in the case of an aortic valve, optionally including a portion positioned in the ascending aorta. In some other embodiments, for example, the pumps may be, in use, positioned further downstream, such as being disposed in a descending aorta.

Figure 4:
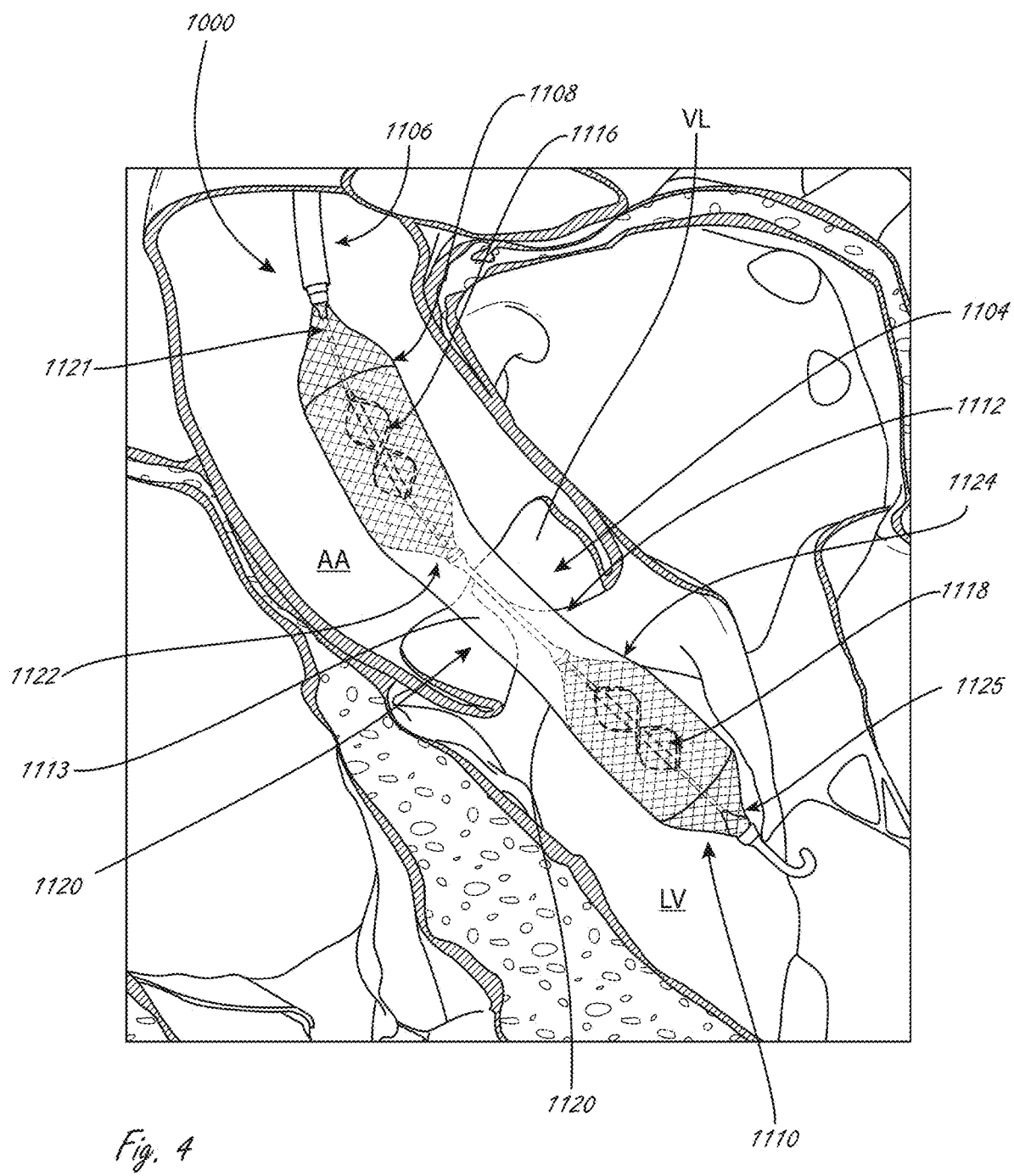
FIG. 4 illustrates an exemplary target location of an expandable pump portion, the pump portion including a blood conduit, a plurality of expandable members, and a plurality of impellers.

FIG. 4 illustrates an exemplary placement of working portion 1104 from system 1000 from FIG. 2. Once difference shown in FIG. 4 is that the conduit extends at least as far as the ends of the impellers, like in FIGS. 3A-3D. FIG. 4 shows working portion 1104 in a deployed configuration, positioned in place across an aortic valve. Working portion 1104 can be delivered as shown via, for example without limitation, femoral artery access (a known access procedure). While not shown for clarity, system 1000 can also include an outer sheath or shaft in which working portion 1104 is disposed during delivery to a location near an aortic valve. The sheath or shaft can be moved proximally (towards the ascending aorta "AA" and away from left ventricle "LV") to allow for deployment and expansion of working portion 1104. For example, the sheath can be withdrawn to allow for expansion of second expandable member 1110, with continued proximal movement allowing first expandable member 1108 to expand.

In this embodiment, second expandable member 1110 has been expanded and positioned in a deployed configuration such that distal end 1125 is in the left ventricle "LV." and distal to aortic valve leaflets "VL." as well as distal to the annulus. Proximal end 1124 has also been positioned distal to leaflets VL, but in some methods proximal end 1124 may extend slightly axially within the leaflets VL. This embodiment is an example of a method in which at least half of the second expandable member 1110 is within the left ventricle, as measured along its length (measured along the longitudinal axis). And as shown, this is also an example of a method in which the entire second expandable member 1110 is within the left ventricle. This is also an example of a method in which at least half of second impeller 1118 is positioned within the left ventricle, and also an embodiment in which the entire second impeller 1118 is positioned within the left ventricle.

Continued retraction of an outer shaft or sheath (and/or distal movement of working end 1104 relative to an outer sheath or shaft) continues to release conduit 1112, until central region 1113 is released and deployed. The expansion of expandable members 1108 and 1110 causes conduit 1112 to assume a more open configuration, as shown in FIG. 4. Thus, while in this embodiment conduit 1112 does not have the same self-expanding properties as the expandable members, the conduit will assume a deployed, more open configuration when the working end is deployed. At least a portion of central region 1113 of conduit 1112 is positioned at an aortic valve coaptation region. In FIGS. 3, there is a short length of central region 1113 that extends distally beyond the leaflets VL, but at least some portion of central region 1113 is axially within the leaflets.

Continued retraction of an outer shaft or sheath (and/or distal movement of working end 1104 relative to an outer sheath or shaft) deploys first expandable member 1108. In this embodiment, first expandable member 1108 has been expanded and positioned (as shown) in a deployed configuration such that proximal end 1121 is in the ascending aorta AA, and proximal to leaflets "VL." Distal end 1122 has also been positioned proximal to leaflets VL, but in some methods distal end 1122 may extend slightly axially within the leaflets VL. This embodiment is an example of a method in which at least half of first expandable member 1110 is within the ascending aorta, as measured along its length (measured along the longitudinal axis). And as shown, this is also an example of a method in which the entire first expandable member 1110 is within the AA. This is also an example of a method in which at least half of first impeller 1116 is positioned within the AA, and also an embodiment in which the entire first impeller 1116 is positioned within the AA.

At any time during or after deployment of working portion 1104, the position of the working portion can be assessed in any way, such as under fluoroscopy. The position of the working portion can be adjusted at any time during or after deployment. For example, after second expandable member 1110 is released but before first expandable member 1108 is released, working portion 1104 can be moved axially (distally or proximally) to reposition the working portion. Additionally, for example, the working portion can be repositioned after the entire working portion has been released from a sheath to a desired final position.

It is understood that the positions of the components (relative to the anatomy) shown in FIG. 4 are considered exemplary final positions for the different components of working portion 1104, even if there was repositioning that occurred after initial deployment.

The one or more expandable members herein can be configured to be, and can be expanded in a variety of ways, such as via self-expansion, mechanical actuation (e.g., one or more axially directed forces on the expandable member, expanded with a separate balloon positioned radially within the expandable member and inflated to push radially outward on the expandable member), or a combination thereof.

Expansion as used herein refers generally to reconfiguration to a larger profile with a larger radially outermost dimension (relative to the longitudinal axis), regardless of the specific manner in which the one or more components are expanded. For example, a stent that self-expands and/or is subject to a radially outward force can "expand" as that term is used herein. A device that unfurls or unrolls can also assume a larger profile, and can be considered to expand as that term is used herein.

The impellers can similarly be adapted and configured to be, and can be expanded in a variety of ways depending on their construction. For examples, one or more impellers can, upon release from a sheath, automatically revert to or towards a different larger profile configuration due to the material(s) and/or construction of the impeller design (see, for example, U.S. Pat. No. 6,533,716, or U.S. Pat. No. 7,393,181, both of which are incorporated by reference herein for all purposes). Retraction of an outer restraint can thus, in some embodiments, allow both the expandable member and the impeller to revert naturally to a larger profile, deployed configuration without any further actuation.

As shown in the example in FIG. 4, the working portion includes first and second impellers that are spaced on either side of an aortic valve, each disposed within a separate expandable member. This is in contrast to some designs in which a working portion includes a single elongate expandable member. Rather than a single generally tubular expandable member extending all the way across the valve, working end 1104 includes a conduit 1112 extending between expandable members 1108 and 1110. The conduit is more flexible and deformable than the expandable baskets, which can allow for more deformation of the working portion at the location of the leaflets than would occur if an expandable member spanned the aortic valve leaflets. This can cause less damage to the leaflets after the working portion has been deployed in the subject.

Additionally, forces on a central region of a single expandable member from the leaflets might translate axially to other regions of the expandable member, perhaps causing undesired deformation of the expandable member at the locations of the one or more impellers. This may cause the outer expandable member to contact the impeller, undesirably interfering with the rotation of the impeller. Designs that include separate expandable members around each impeller, particularly where each expandable member and each impeller are supported at both ends (i.e., distal and proximal), result in a high level of precision in locating the impeller relative to the expandable member. Two separate expandable members may be able to more reliably retain their deployed configurations compared with a single expandable member.

As described herein above, it may be desirable to be able to reconfigure the working portion so that it can be delivered within a 9F sheath and still obtain high enough flow rates when in use, which is not possible with some products currently in development and/or testing. For example, some products are too large to be able to reconfigured to a small enough delivery profile, while some smaller designs may not be able to achieve the desired high flow rates. An exemplary advantage of the examples in FIGS. 1, 2, 3A-3D and 4 is that, for example, the first and second impellers can work together to achieve the desired flow rates, and by having two axially spaced impellers, the overall working portion can be reconfigured to a smaller delivery profile than designs in which a single impeller is used to achieved the desired flow rates. These embodiments thus use a plurality of smaller, reconfigurable impellers that are axially spaced to achieve both the desired smaller delivery profile as well as to achieve the desired high flow rates.

The embodiment herein can thus achieve a smaller delivery profile while maintaining sufficiently high flow rates, while creating a more deformable and flexible central region of the working portion, the exemplary benefits of which are described above (e.g., interfacing with delicate valve leaflets).

Figure 5:
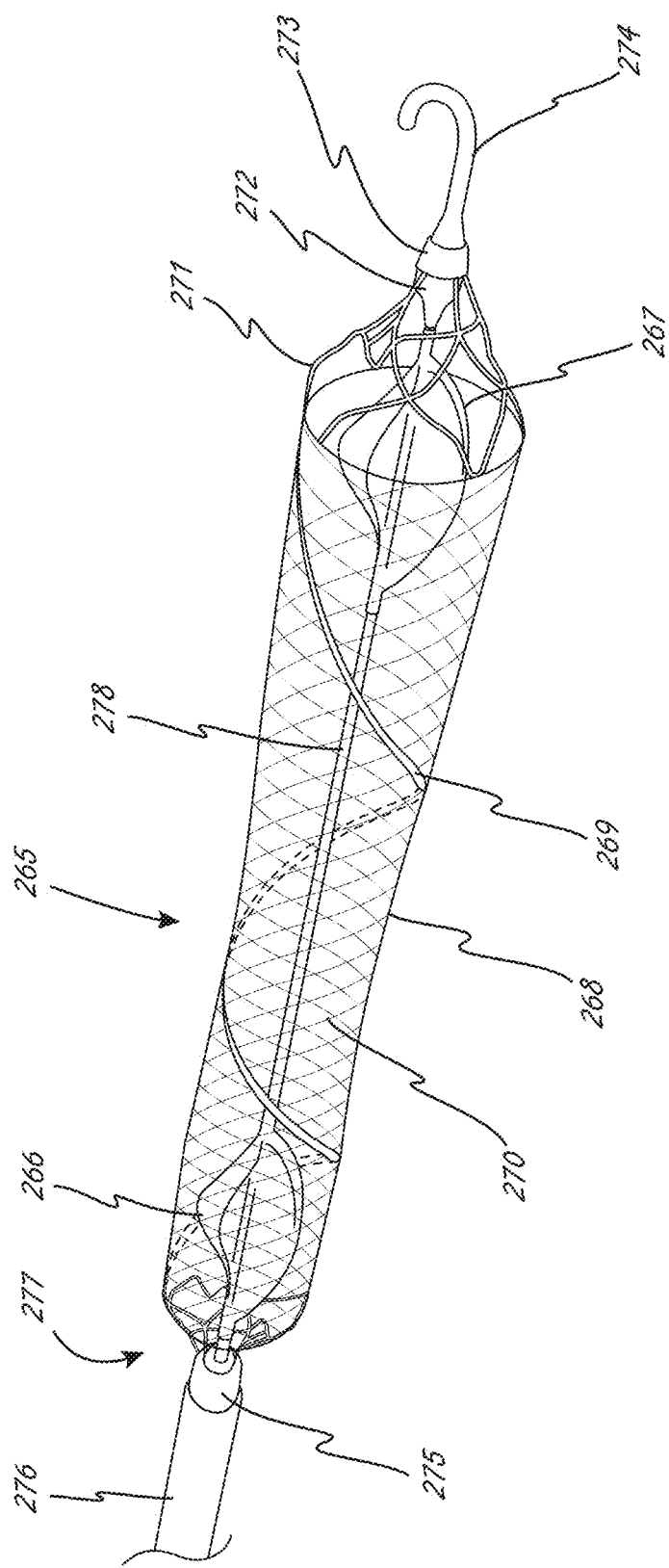
FIG. 5 illustrates an exemplary pump portion including an expandable impeller housing, a blood conduit, and a plurality of impellers.

FIG. 5 illustrates a working portion that is similar to the working portion shown in FIG. 1. Working portion 265 includes proximal impeller 266, distal impeller 267, both of which are coupled to drive shaft 278, which extends into distal bearing housing 272. There is a similar proximal bearing housing at the proximal end of the working portion. Working portion also includes expandable member, referred to 270 generally, and conduit 268 that is secured to the expandable member and extends almost the entire length of expandable member. Expandable member 270 includes distal struts 271 that extend to and are secured to strut support 273, which is secured to distal tip 273. Expandable member 270 also includes proximal struts there are secured to a proximal strut support. All features similar to that shown in FIG. 1 are incorporated by reference for all purposes into this embodiment even if not explicitly stated. Expandable member 265 also includes helical tension member 269 that is disposed along the periphery of the expandable member, and has a helical configuration when the expandable member is in the expanded configuration as shown. The helical tension member 269 is disposed and adapted to induce rotation wrap upon collapse. Working portion 265 can be collapsed from the shown expanded configuration while simultaneously rotating one or both impellers at a relatively slow speed to facilitate curled collapse of the impellers due to interaction with the expandable member. Helical tension member 269 (or a helical arrangement of expandable member cells) will act as a collective tension member and is configured so that when the expandable basket is pulled in tension along its length to collapse (such as by stretching to a much greater length, such as approximately doubling in length) tension member 269 is pulled into a straighter alignment, which causes rotation/twisting of the desired segment(s) of the expandable member during collapse, which causes the impeller blades to wrap radially inward as the expandable member and blades collapse. An exemplary configuration of such a tension member would have a curvilinear configuration when in helical form that is approximately equal to the maximum length of the expandable member when collapsed. In alternative embodiments, only the portion(s) of the expandable member that encloses a collapsible impeller is caused to rotate upon collapse.

There are alternative ways to construct the working portion to cause rotation of the expandable member upon collapse by elongation (and thus cause wrapping and collapse of the impeller blades). Any expandable member can be constructed with this feature, even in dual-impeller designs. For example, with an expandable member that includes a plurality of "cells." as that term is commonly known (e.g., a laser cut elongate member), the expandable member may have a plurality of particular cells that together define a particular configuration such as a helical configuration, wherein the cells that define the configuration have different physical characteristics than other cells in the expandable member. In some embodiments the expandable member can have a braided construction, and the twist region may constitute the entire group of wires, or a significant portion (e.g., more than half), of the braided wires. Such a twisted braid construction may be accomplished, for example, during the braiding process, such as by twisting the mandrel that the wires are braided onto as the mandrel is pulled along, especially along the length of the largest-diameter portion of the braided structure. The construction could also be accomplished during a second operation of the construction process, such as mechanically twisting a braided structure prior to heat-setting the wound profile over a shaped mandrel.

Any of the conduits herein act to, are configured to, and are made of material(s) that create a fluid lumen therein between a first end (e.g., distal end) and a second end (e.g., proximal end). Fluid flows into the inflow region, through the fluid lumen, and then out of an outflow region. Flow into the inflow region may be labeled herein as "I." and flow out at the outflow region may be labeled "O." Any of the conduits herein can be impermeable. Any of the conduits herein can alternatively be semipermeable. Any of the conduits herein may also be porous, but will still define a fluid lumen therethrough. In some embodiments the conduit is a membrane, or other relatively thin layered member. Any of the conduits herein, unless indicated to the contrary, can be secured to an expandable member such that the conduit, where is it secured, can be radially inside and/or outside of the expandable member. For example, a conduit can extend radially within the expandable member so that inner surface of the conduit is radially within the expandable member where it is secured to the expandable member.

Any of the expandable member(s) herein can be constructed of a variety of materials and in a variety of ways. For example, the expandable member may have a braided construction, or it can be formed by laser machining. The material can be deformable, such as nitinol. The expandable member can be self-expanding or can be adapted to be at least partially actively expanded.

In some embodiments, the expandable member is adapted to self-expand when released from within a containing tubular member such as a delivery catheter, a guide catheter or an access sheath. In some alternative embodiments, the expandable member is adapted to expand by active expansion, such as action of a pull-rod that moves at least one of the distal end and the proximal end of the expandable member toward each other. In alternative embodiments, the deployed configuration can be influenced by the configuration of one or more expandable structures. In some embodiments, the one or more expandable members can be deployed, at least in part, through the influence of blood flowing through the conduit. Any combination of the above mechanisms of expansion may be used.

The blood pumps and fluid movement devices, system and methods herein can be used and positioned in a variety of locations within a body. While specific examples may be provided herein, it is understood that that the working portions can be positioned in different regions of a body than those specifically described herein.

Figure 6A:
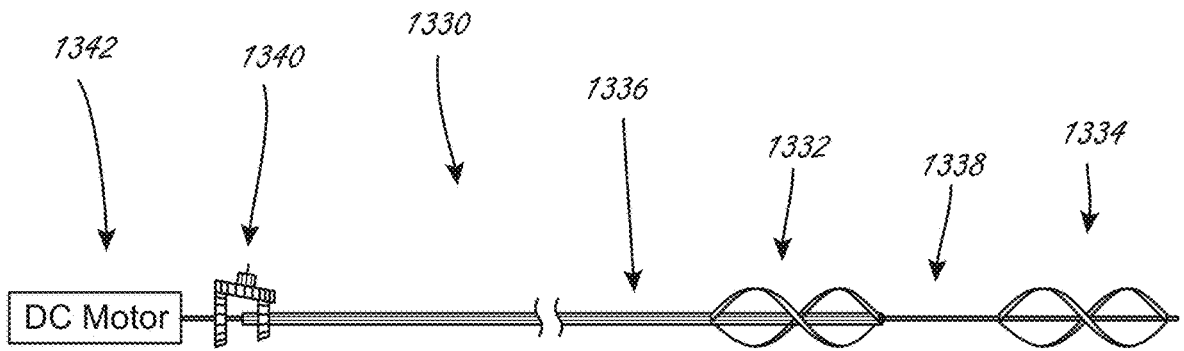
FIG. 6A illustrates at least a portion of an exemplary catheter blood pump that includes a pump portion, wherein at least two different impellers can be rotated at different speeds.

In any of the embodiments herein in which the medical device includes a plurality of impellers, the device can be adapted such that the impellers rotate at different speeds. FIG. 6A illustrates a medical device that includes gearset 1340 coupled to both inner drive member 1338 and outer drive member 1336, which are in operable communication with distal impeller 1334 and proximal impeller 1332, respectively. The device also includes motor 1342, which drives the rotation of inner drive member 1338. Inner drive member 1338 extends through outer drive member 1336. Activation of the motor 1332 causes the two impellers to rotate at different speeds due to an underdrive or overdrive ratio. Gearset 1340 can be adapted to drive either the proximal or distal impeller faster than the other. Any of the devices herein can include any of the gearsets herein to drive the impellers at different speeds.

Figure 6B:
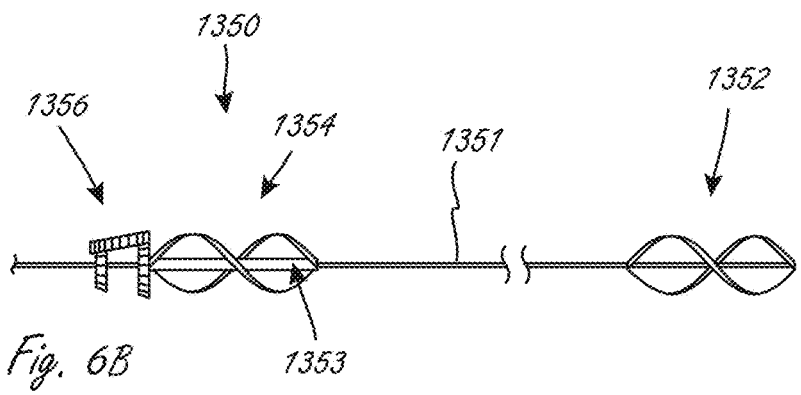
FIG. 6B illustrates at least a portion of an exemplary catheter blood pump that includes a pump portion, where at least two different impellers can be rotated at different speeds.

FIG. 6B illustrates a portion of an alternative embodiment of a dual impeller device (1350) that is also adapted such that the different impellers rotate at different speeds. Gearset 1356 is coupled to both inner drive member 1351 and outer drive member 1353, which are coupled to distal impeller 1352 and proximal impeller 1354, respectively. The device also includes a motor like in FIG. 6A. FIGS. 6A and 6B illustrate how a gearset can be adapted to drive the proximal impeller slower or faster than the distal impeller.

Figure 7:
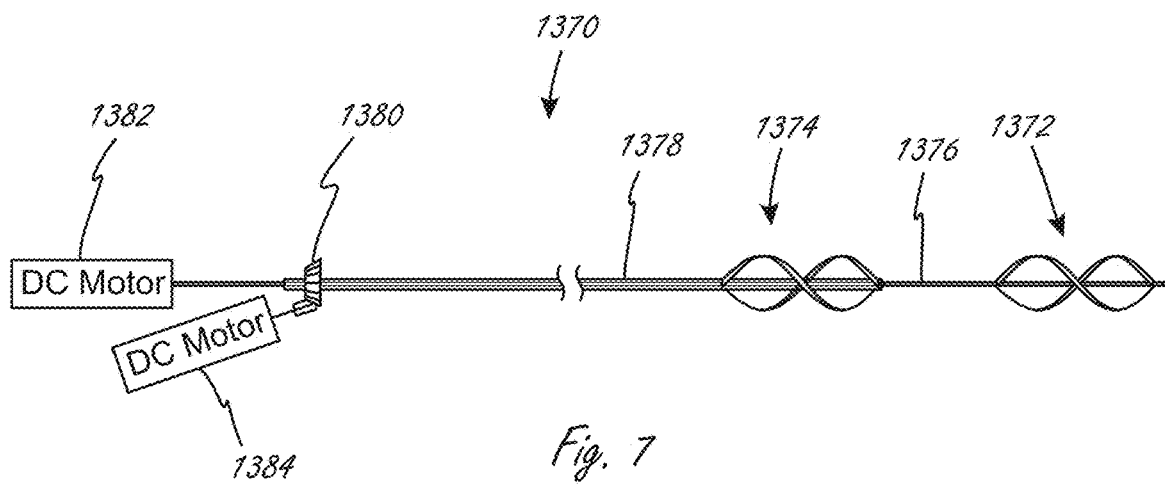
FIG. 7 illustrates at least a portion of an exemplary catheter blood pump that includes a pump portion.

FIG. 7 shows an exemplary alternative embodiment of fluid pump 1370 that can rotate first and second impellers at different speeds. First motor 1382 drives cable 1376, which is coupled to distal impeller 1372, while second motor 1384 drives outer drive member 1378 (via gearset 1380), which is coupled to proximal impeller 1374. Drive cable 1376 extends through outer drive member 1378. The motors can be individually controlled and operated, and thus the speeds of the two impellers can be controlled separately. This system setup can be used with any system herein that includes a plurality of impellers.

Figure 6C:
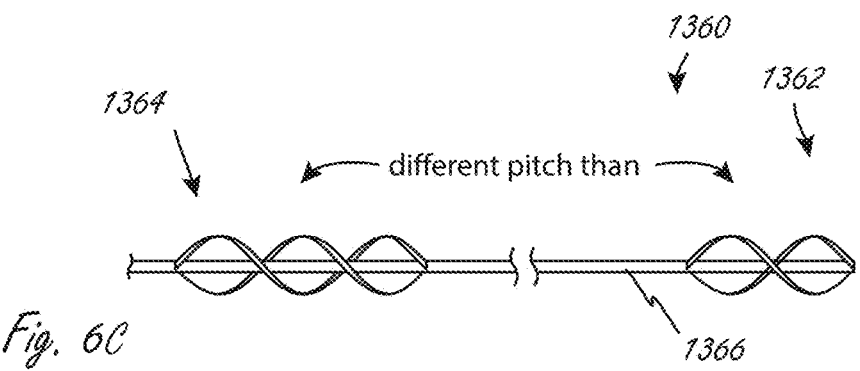
FIG. 6C illustrates at least a portion of an exemplary catheter blood pump that includes a pump portion with at least two impellers having different pitches.

In some embodiments, a common drive cable or shaft can drive the rotation of two (or more) impellers, but the blade pitch of the two impellers (angle of rotational curvature) can be different, with the distal or proximal impeller having a steeper or more gradual angle than the other impeller. This can produce a similar effect to having a gearset. FIG. 6C shows a portion of a medical device (1360) that includes common drive cable 1366 coupled to proximal impeller 1364 and distal impeller 1362, and to a motor not shown. The proximal impellers herein can have a greater or less pitch than the distal impellers herein. Any of the working portions (or distal portions) herein with a plurality of impellers can be modified to include first and second impellers with different pitches.

In any of the embodiments herein, the pump portion can have a compliant or semi-compliant (referred to generally together as "compliant") exterior structure. In various embodiments, the compliant portion is pliable. In various embodiments, the compliant portion deforms only partially under pressure. For example, the central portion of the pump may be formed of a compliant exterior structure such that it deforms in response to forces of the valve. In this manner the exterior forces of the pump on the valve leaflets are reduced. This can help prevent damage to the valve at the location where it spans the valve.

Figure 8:
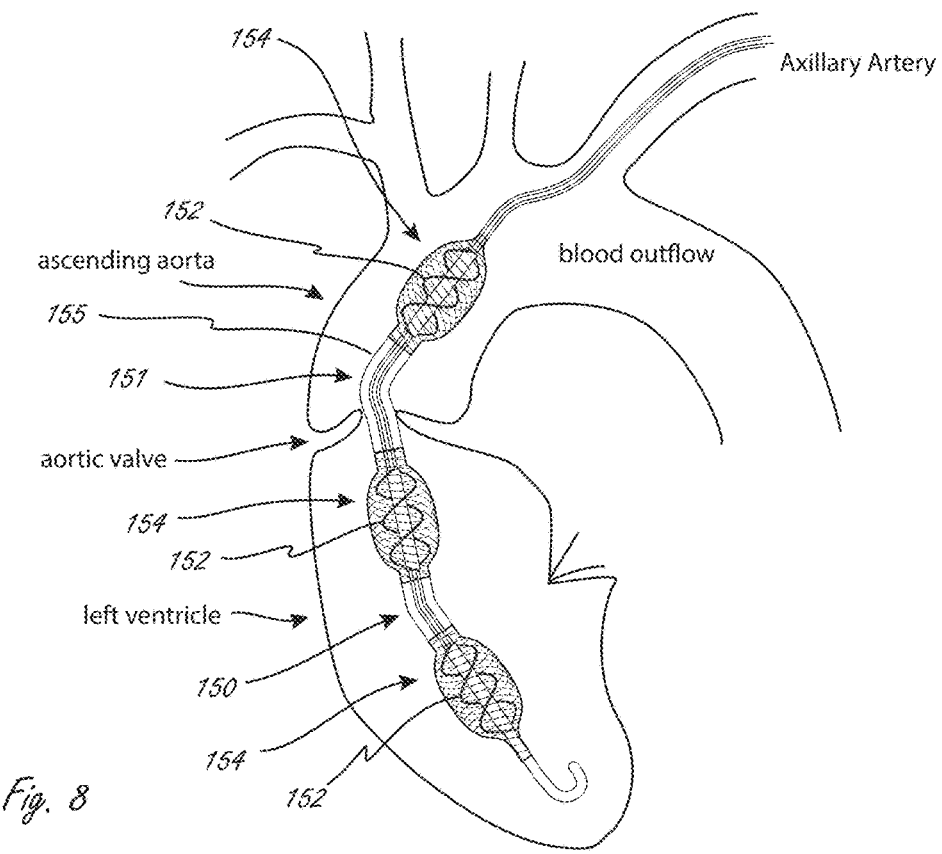
FIG. 8 illustrates an exemplary expandable pump portion including a plurality of expandable impellers, including one or more bends formed therein between adjacent impellers.

FIG. 8 illustrates an exemplary embodiment of a pump portion that includes first, second and third axially spaced impellers 152, each of which is disposed within an expandable member 154. Conduit 155 can extend along the length of the pump portion, as in described in various embodiments herein, which can help create and define the fluid lumen. In alternative embodiments, however, the first, second, and third impellers may be disposed within a single expandable member, similar to that shown in FIG. 1. In FIG. 8, a fluid lumen extends from a distal end to a proximal end, features of which are described elsewhere herein. The embodiment in FIG. 8 can include any other suitable feature, including methods of use, described herein.

The embodiment in FIG. 8 is also an example of an outer housing having at least one bend formed therein between a proximal impeller distal end and a distal impeller proximal end, such that a distal region of the housing distal to the bend is not axially aligned with a proximal region of the housing proximal to the bend along an axis. In this embodiment there are two bends 150 and 151 formed in the housing, each one between two adjacent impellers.

In a method of use, a bend formed in a housing can be positioned to span a valve, such as the aortic valve shown in FIG. 8. In this method of placement, a central impeller and distal-most impeller are positioned in the left ventricle, and a proximal-most impeller is positioned in the ascending aorta. Bend 151 is positioned just downstream to the aortic valve.

A bend such as bend 150 or 151 can be incorporated into any of the embodiments or designs herein. The bend may be a preformed angle or may be adjustable in situ.

In any of the embodiments herein, unless indicated to the contrary, the outer housing can have a substantially uniform diameter along its length.

In FIG. 8, the pump is positioned via the axillary artery, which is an exemplary method of accessing the aortic valve, and which allows the patient to walk and be active with less interruption. Any of the devices herein can be positioned via the axillary artery. One will appreciate from the description herein, however, that the pump may be introduced and tracked into position in various manner including a femoral approach over the aortic arch.

One aspect of the disclosure is an intravascular blood pump that includes a distal impeller axially spaced from a proximal impeller. In one embodiment, the distal and proximal impellers are separated from each other. For example, the distal and proximal impellers may be connected solely by their individual attachment to a common driveshaft. This is distinct from an impeller having multiple blade rows. A distal impeller as that phrase is used herein does not necessarily mean a distal-most impeller of the pump, but can refer generally to an impeller that is positioned further distally than a proximal impeller, even if there is an additional impeller than is disposed further distally than the distal impeller. Similarly, a proximal impeller as that phrase is used herein does not necessarily mean a proximal-most impeller of the pump, but can refer generally to an impeller that is positioned further proximally than a proximal impeller, even if there is an additional impeller than is disposed further proximally than the proximal impeller. Axial spacing (or some derivative thereof) refers to spacing along the length of a pump portion, such as along a longitudinal axis of the pump portion, even if there is a bend in the pump portion. In various embodiments, each of the proximal and distal impellers are positioned within respective housings and configured to maintain a precise, consistent tip gap, and the span between the impellers has a relatively more flexible (or completely flexible) fluid lumen. For example, each of the impellers may be positioned within a respective housing having relatively rigid outer wall to resist radial collapse. The sections between the impellers may be relatively rigid, in some embodiments the section is held open primarily by the fluid pressure within.

Although not required for the embodiments therein, there may be advantages to having a minimum axial spacing between a proximal impeller and a distal impeller. For example, a pump portion may be delivered to a target location through parts of the anatomy that have relatively tight bends, such as, for example, an aorta, and down into the aortic valve. For example, a pump portion may be delivered through a femoral artery access and to an aortic valve. It can be advantageous to have a system that is easier to bend so that it is easier to deliver the system through the bend(s) in the anatomy. Some designs where multiple impellers are quite close to each other may make the system, along the length that spans the multiple impellers, relatively stiff along that entire length that spans the multiple impellers. Spacing the impellers apart axially, and optionally providing a relatively flexible region in between the impellers, can create a part of the system that is more flexible, is easier to bend, and can be advanced through the bends more easily and more safely. An additional exemplary advantage is that the axial spacing can allow for a relatively more compliant region between the impellers, which can be positioned at, for example, the location of a valve (e.g., an aortic valve). Furthermore, there are other potential advantages and functional differences between the various embodiments herein and typical multistage pumps. A typical multistage pump includes rows of blades (sometimes referred to as impellers) in close functional spacing such that the rows of blades act together as a synchronized stage. One will appreciate that the flow may separate as it passes through the distal impeller. In various embodiments as described herein, distal and proximal impellers can be spaced sufficiently apart such that the flow separation from the distal impeller is substantially reduced (i.e., increased flow reattachment) and the localized turbulent flow is dissipated before the flow enters the proximal impeller.

Figure 9:
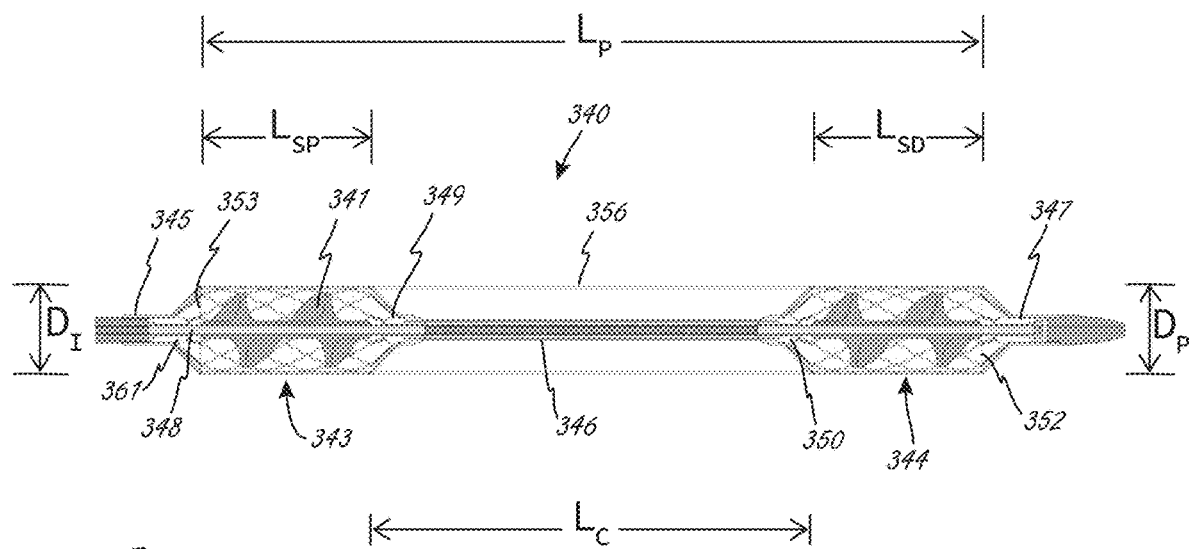
FIG. 9 illustrates an exemplary expandable pump portion comprising a plurality of impellers and a blood conduit.

In any of the embodiments or in any part of the description herein that include a distal impeller and a proximal impeller, the axial spacing between a distal end of the proximal impeller and a proximal end of the distal impeller can be from 1.5 cm to 25 cm (inclusive) along a longitudinal axis of the pump portion, or along a longitudinal axis of a housing portion that includes a fluid lumen. The distance may be measured when the pump portion, including any impellers, is in an expanded configuration. This exemplary range can provide the exemplary flexibility benefits described herein as the pump portion is delivered through curved portions of the anatomy, such as, for example, an aortic valve via an aorta. FIG. 9 (shown outside a patient in an expanded configuration) illustrates length Lc, which illustrates an axial spacing between impellers, and in some embodiments may be from 1.5 cm to 25 cm as set forth herein. In embodiments in which there may be more than two impellers, any two adjacent impellers (i.e., impellers that do not have any other rotating impeller in between them) may be spaced axially by any of the axial spacing distances described herein.

While some embodiments include a proximal impeller distal end that is axially spaced 1.5 cm to 25 cm from a distal impeller proximal end along an axis, the disclosure herein also includes any axial spacings that are subranges within that general range of 1.5 cm to 25 cm. That is, the disclosure includes all ranges that have any lower limit from 1.5 and above in that range, and all subranges that have any upper limit from 25 cm and below. The examples below provide exemplary subranges. In some embodiments, a proximal impeller distal end is axially spaced 1.5 cm to 20 cm from a distal impeller proximal end along an axis, 1.5 cm to 15 cm, 1.5 cm to 10 cm, 1.5 cm to 7.5 cm, 1.5 cm to 6 cm, 1.5 cm to 4.5 cm. 1.5 cm to 3 cm. In some embodiments the axial spacing is 2 cm to 20 cm, 2 cm to 15 cm, 2 cm to 12 cm, 2 cm to 10 cm, 2 cm to 7.5 cm, 2 cm to 6 cm, 2 cm to 4.5 cm, 2 cm to 3 cm. In some embodiments the axial spacing is 2.5 cm to 15 cm, 2.5 cm to 12.5 cm, 2.5 cm to 10 cm, 2.5 cm to 7.5 cm, or 2.5 cm to 5 cm (e.g., 3 cm). In some embodiments the axial spacing is 3 cm to 20 cm, 3 cm to 15 cm, 3 cm to 10 cm, 3 cm to 7.5 cm, 3 cm to 6 cm, or 3 cm to 4.5 cm. In some embodiments the axial spacing is 4 cm to 20 cm, 4 cm to 15 cm, 4 cm to 10 cm, 4 cm to 7.5 cm, 4 cm to 6 cm, or 4 cm to 4.5 cm. In some embodiments the axial spacing is 5 cm to 20 cm, 5 cm to 15 cm, 5 cm to 10 cm, 5 cm to 7.5 cm, or 5 cm to 6 cm. In some embodiments the axial spacing is 6 cm to 20 cm, 6 cm to 15 cm, 6 cm to 10 cm, or 6 cm to 7.5 cm. In some embodiments the axial spacing is 7 cm to 20 cm, 7 cm to 15 cm, or 7 cm to 10 cm. In some embodiments the axial spacing is 8 cm to 20 cm, 8 cm to 15 cm, or 8 cm to 10 cm. In some embodiments the axial spacing is 9 cm to 20 cm, 9 cm to 15 cm, or 9 cm to 10 cm. In various embodiments, the fluid lumen between the impellers is relatively unsupported.

In any of the embodiments herein the one or more impellers may have a length, as measured axially between an impeller distal end and an impeller proximal end (shown as "$L_{SD}$" and "$L_{SP}$", respectively, in FIG. 9), from 0.5 cm to 10 cm, or any subrange thereof. The examples below provides exemplary subranges. In some embodiments the impeller axial length is from 0.5 cm to 7.5 cm, from 0.5 cm to 5 cm, from 0.5 cm to 4 cm, from 0.5 cm to 3 cm, from 0.5 cm to 2, or from 0.5 cm to 1.5 cm. In some embodiments the impeller axial length is from 0.8 cm to 7.5 cm, from 0.8 cm to 5 cm, from 0.8 cm to 4 cm, from 0.8 cm to 3 cm, from 0.8 cm to 2 cm, or from 0.8 cm to 1.5 cm. In some embodiments the impeller axial length is from 1 cm to 7.5 cm, from 1 cm to 5 cm, from 1 cm to 4 cm, from 1 cm to 3 cm, from 1 cm to 2 cm, or from 1 cm to 1.5 cm. In some embodiments the impeller axial length is from 1.2 cm to 7.5 cm, from 1.2 cm to 5 cm, from 1.2 cm to 4 cm, from 1.2 cm to 3 cm, from 1.2 cm to 2 cm, or from 1.2 cm to 1.5 cm. In some embodiments the impeller axial length is from 1.5 cm to 7.5 cm, from 1.5 cm to 5 cm, from 1.5 cm to 4 cm, from 1.5 cm to 3 cm, or from 1.5 cm to 2 cm. In some embodiments the impeller axial length is from 2 cm to 7.5 cm, from 2 cm to 5 cm, from 2 cm to 4 cm, or from 2 cm to 3 cm. In some embodiments the impeller axial length is from 3 cm to 7.5 cm, from 3 cm to 5 cm, or from 3 cm to 4 cm. In some embodiments the impeller axial length is from 4 cm to 7.5 cm, or from 4 cm to 5 cm.

In any of the embodiments herein the fluid lumen can have a length from a distal end to a proximal end, shown as length Lp in FIG. 9. In some embodiments the fluid lumen length Lp is from 4 cm to 40 cm, or any subrange therein. For example, in some embodiments the length Lp can be from 4 cm to 30 cm, from 4 cm to 20 cm, from 4 cm to 18 cm, from 4 cm to 16 cm, from 4 cm to 14 cm, from 4 cm to 12 cm, from 4 cm to 10 cm, from 4 cm to 8 cm, from 4 cm to 6 cm.

In any of the embodiments herein the housing can have a deployed diameter, at least the location of an impeller (and optionally at a location between impellers), shown as dimension Dp in FIG. 9. In some embodiments Dp can be from 0.3 cm to 1.5 cm, or any subrange therein. For example, Dp may be from 0.4 cm to 1.4 cm, from 0.4 cm to 1.2 cm, from 0.4 cm to 1.0 cm, from 0.4 cm to 0.8 cm, or from 0.4 cm to. 6 cm. In some embodiments, Dp may be from 0.5 cm to 1.4 cm, from 0.5 cm to 1.2 cm, from 0.5 cm to 1.0 cm, from 0.5 cm to 0.8 cm, or from 0.5 cm to 0.6 cm. In some embodiments Dp may be from 0.6 cm to 1.4 cm, from 0.6 cm to 1.2 cm, from 0.6 cm to 1.0 cm, or from 0.6 cm to 0.8 cm. In some embodiments Dp may be from 0.7 cm to 1.4 cm, from 0.7 cm to 1.2 cm, from 0.7 cm to 1.0 cm, or from 0.7 cm to 0.8 cm.

In any of the embodiments herein an impeller can have a deployed diameter, shown as dimension Di in FIG. 9. In some embodiments Di can be from 1 mm-30 mm, or any subrange therein. For example, in some embodiments Di may be from 1 mm-15 mm, from 2 mm-12 mm, from 2.5 mm-10 mm, or 3 mm-8 mm.

In any of the embodiments herein, a tip gap exists between an impeller outer diameter and a fluid lumen inner diameter. In some embodiments the tip gap can be from 0.01 mm-1 mm, such as 0.05 mm to. 8 mm, or such as 0.1 mm-0.5 mm.

In any of the embodiments herein that includes multiple impellers, the axial spacing between impellers (along the length of the pump portion, even if there is a bend in the pump portion) can be from 2 mm to 100 mm, or any combination of upper and lower limits inclusive of 5 and 100 mm (e.g., from 10 mm-80 mm, from 15 mm-70 mm, from 20 mm-50 mm, 2 mm-45 mm, etc.).

Blood pumps, such as any of the intravascular pumps herein, may benefit from having one or more fluid paths through which fluid can flow through the device. For example without limitation, blood pumps may benefit from having one or more fluid paths through which fluid can flow to perform any of these exemplary functions: cooling rotating components (e.g., a drive cable) to prevent their overheating; flushing small particulates that may break off rotating components (e.g., a drive cable) to prevent the rotating parts from being damaged by the small particulates; lubricating rotating components (e.g., one or more bearings), and preventing blood ingress into the pump (e.g., near or at a distal end of the pump). Fluid delivery through the one or more flow paths may provide any number of these functions. For example, the disclosure in WO 2020/073047A1 is fully incorporated by reference for all purposes.

The following disclosure provides exemplary method steps that may be performed when using any of the blood pumps, or portions thereof, described herein. It is understood that not all of the steps need to be performed, but rather the steps are intended to be an illustrative procedure. It is also intended that, if suitable, in some instances the order of one or more steps may be different.

Before use, the blood pump can be prepared for use by priming the lumens (including any annular spaces) and pump assembly with sterile solution (e.g., heparinized saline) to remove any air bubbles from any fluid lines. The catheter, including any number of purge lines, may then be connected to a console. Alternatively, the catheter may be connected to a console and/or a separate pump that are used to prime the catheter to remove air bubbles.

Figure 10A:
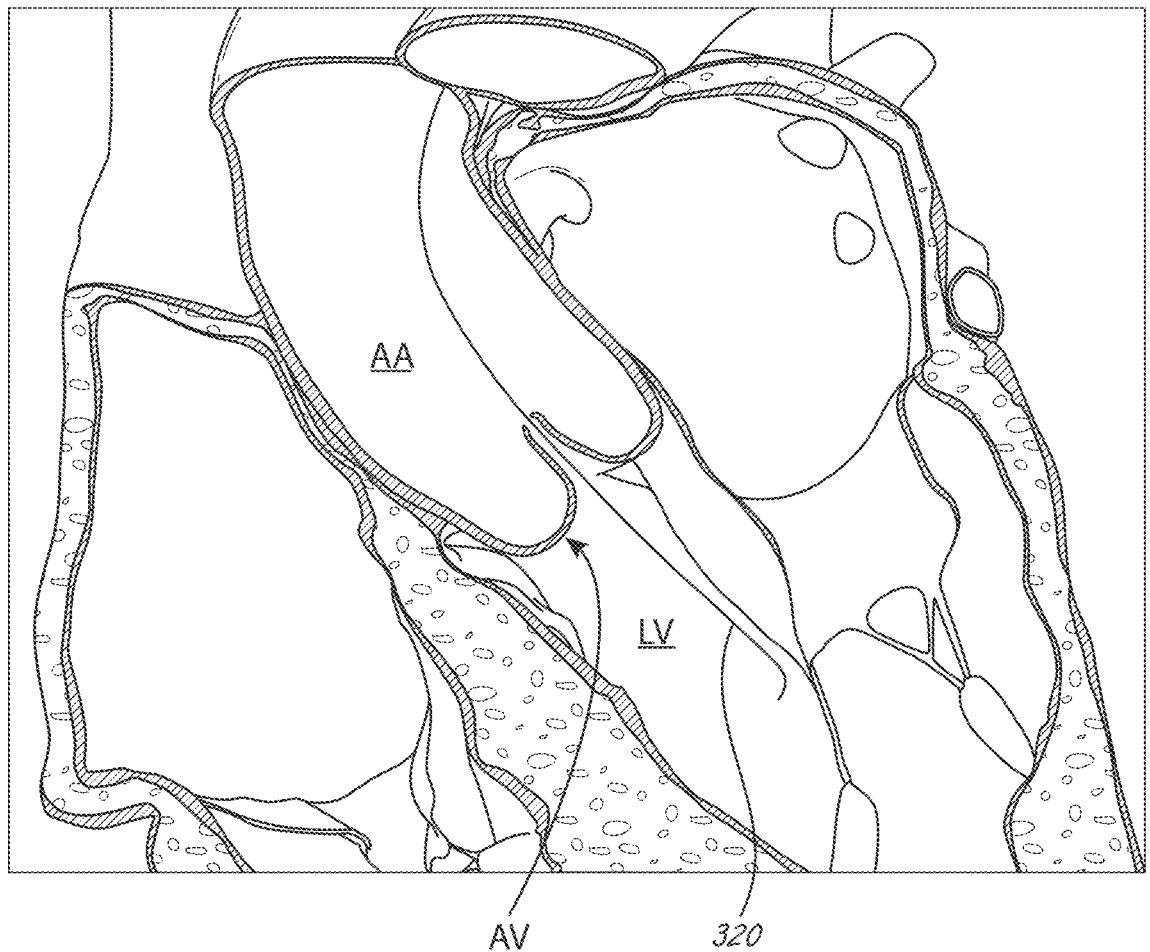
FIGS. 10A-10F illustrate an exemplary sequence of steps that may be performed to deploy an exemplary pump portion of a catheter blood pump.
Figure 10B:
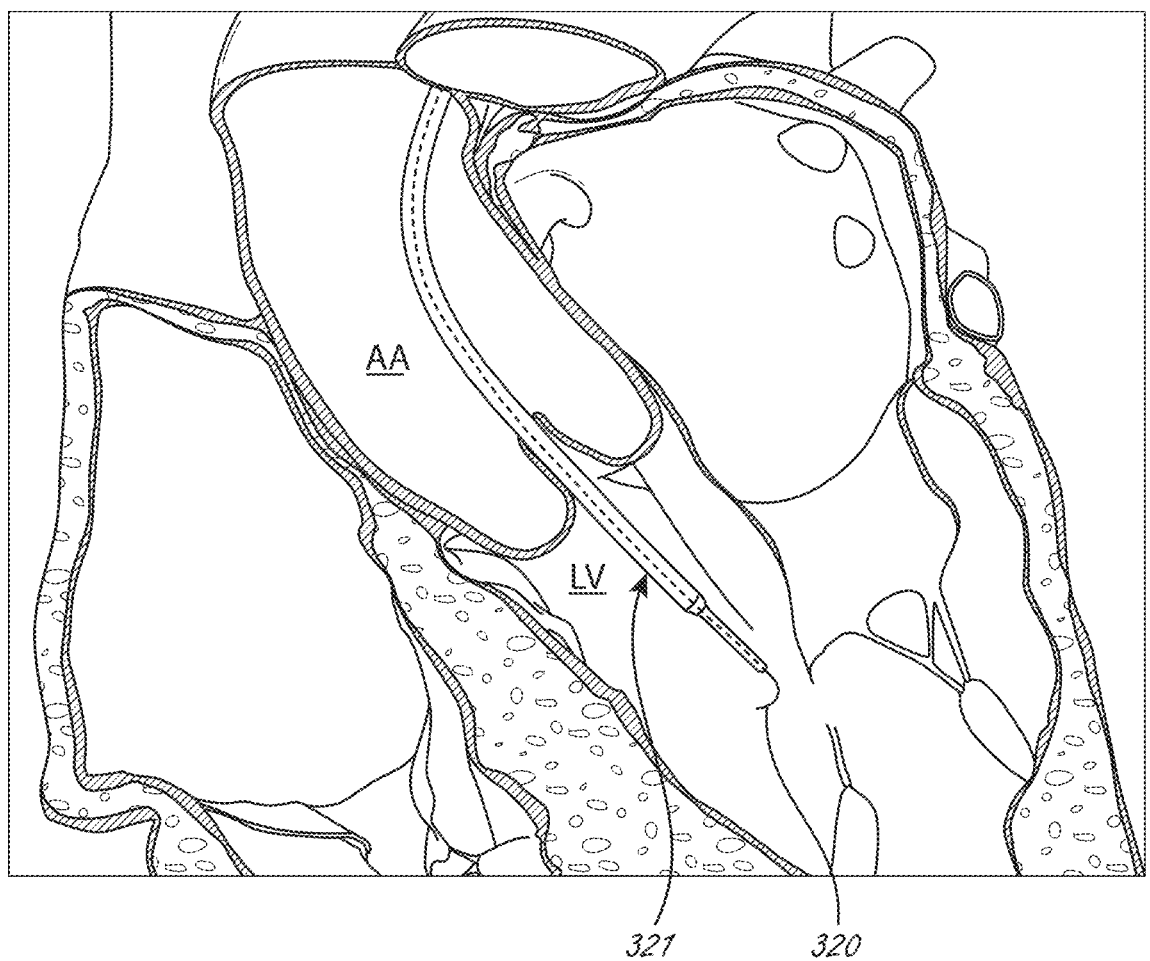

After priming the catheter, access to the patient's vasculature can be obtained (e.g., without limitation, via femoral access) using an appropriately sized introducer sheath. Using standard valve crossing techniques, a diagnostic pigtail catheter may then be advanced over a, for example, 0.035" guide wire until the pigtail catheter is positioned securely in the target location (e.g., left ventricle). The guidewire can then be removed and a second wire 320 (e.g., a 0.018" wire) can be inserted through the pigtail catheter. The pigtail catheter can then be removed (see FIG. 10A), and the blood pump 321 (including a catheter, catheter sheath, and pump portion within the sheath; see FIG. 10B) can be advanced over the second wire towards a target location, such as spanning an aortic valve "AV." and into a target location (e.g., left ventricle "LV"), using, for example, one or more radiopaque markers to position the blood pump.

Figure 10C:
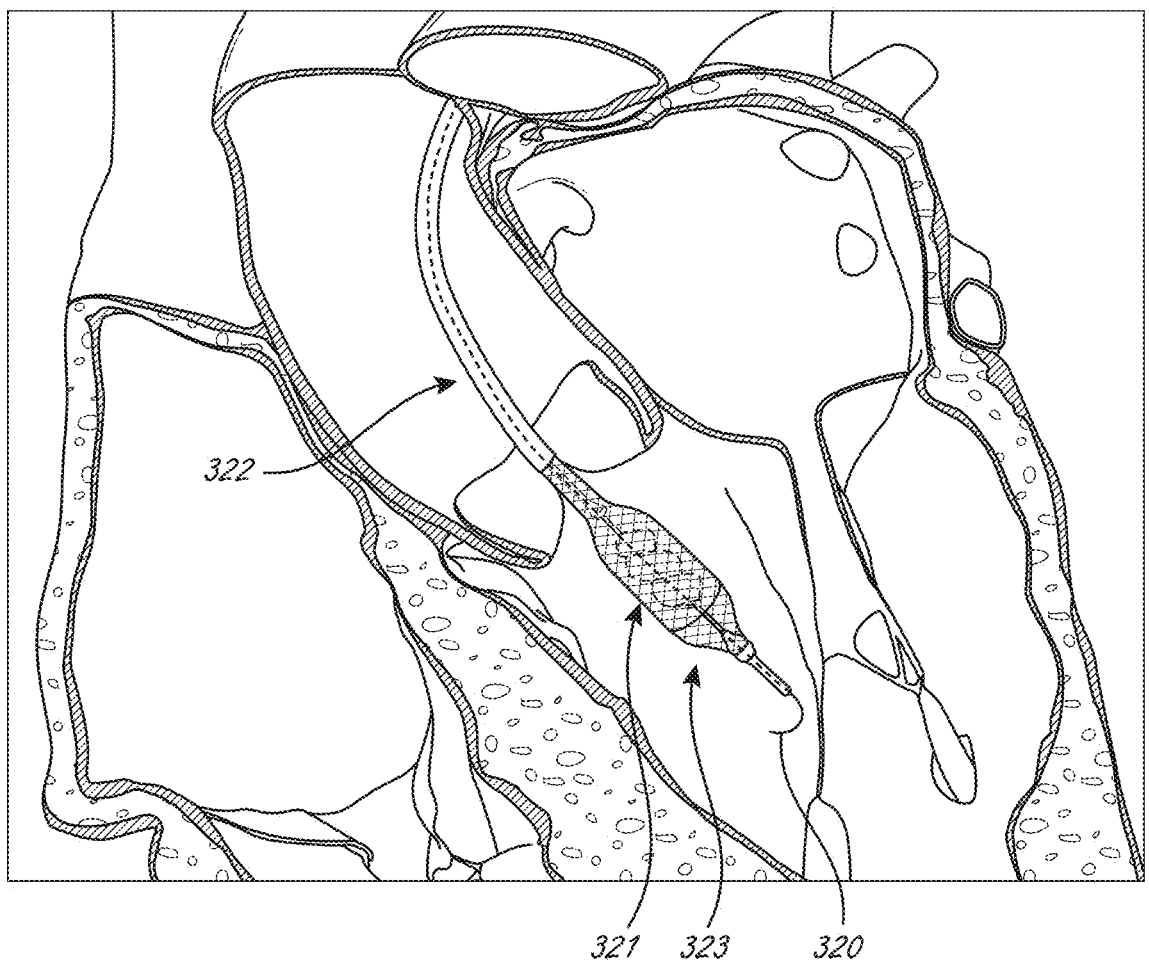
Figure 10D:
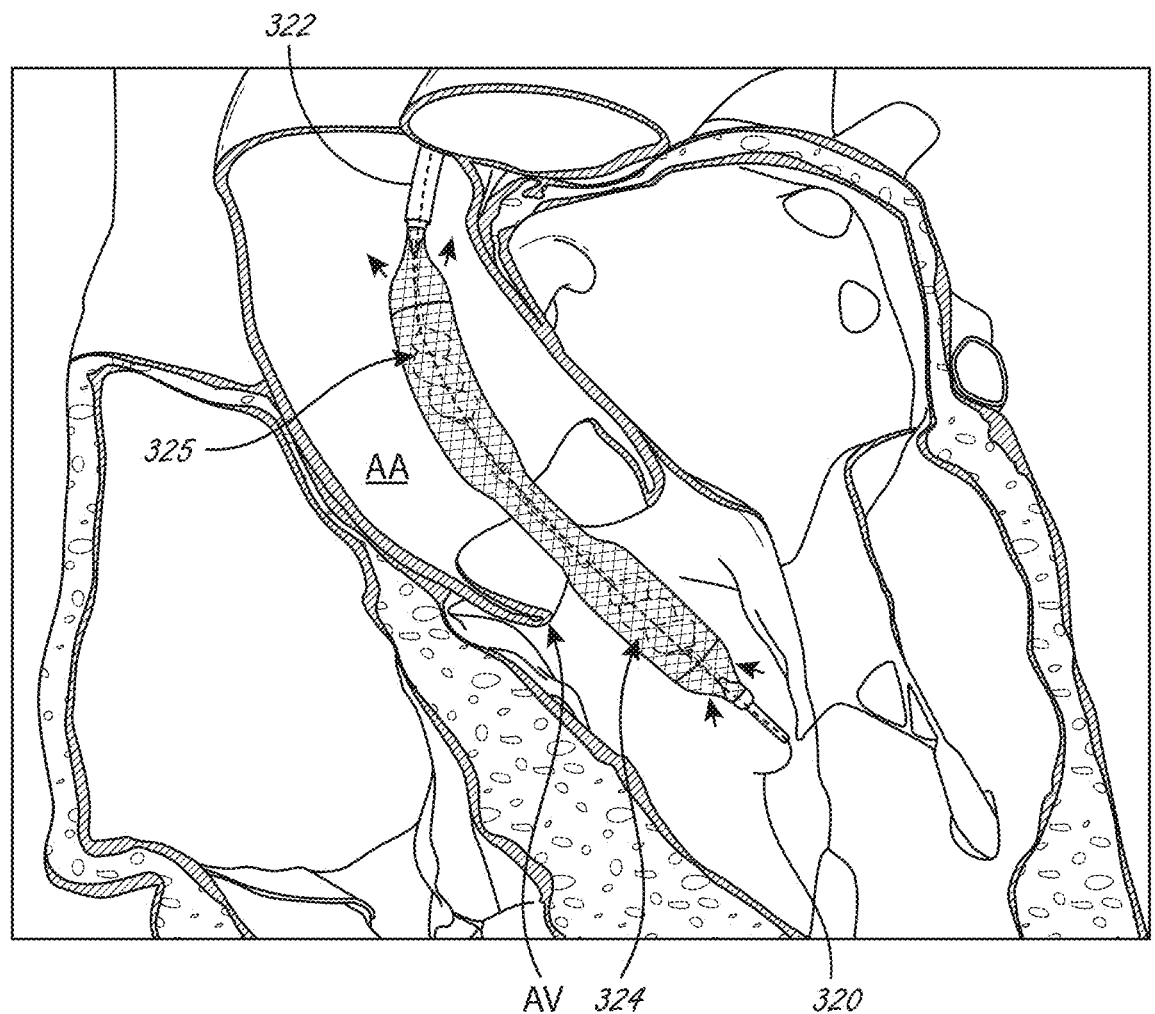

Once proper placement is confirmed, the catheter sheath 322 (see FIG. 10C) can be retracted, exposing first a distal region of the pump portion. In FIG. 10C a distal region of an expandable housing has been released from sheath 322 and is expanded, as is distal impeller 324. A proximal end of housing 323 and a proximal impeller are not yet released from sheath 322. Continued retraction of sheath 322 beyond the proximal end of housing 323 allows the housing 323 and proximal impeller 325 to expand (see FIG. 10D). The inflow region (shown with arrows even though the impellers are not yet rotating) and the distal impeller are in the left ventricle. The outflow (shown with arrows even though the impellers are not rotating yet) and proximal impeller are in the ascending aorta AA. The region of the outer housing in between the two impellers, which may be more flexible than the housing regions surrounding the impellers, as described in more detail herein, spans the aortic valve AV. In an exemplary operating position as shown, an inlet portion of the pump portion will be distal to the aortic valve, in the left ventricle, and an outlet of the pump portion will be proximal to the aortic valve, in the ascending aorta ("AA").

Figure 10E:
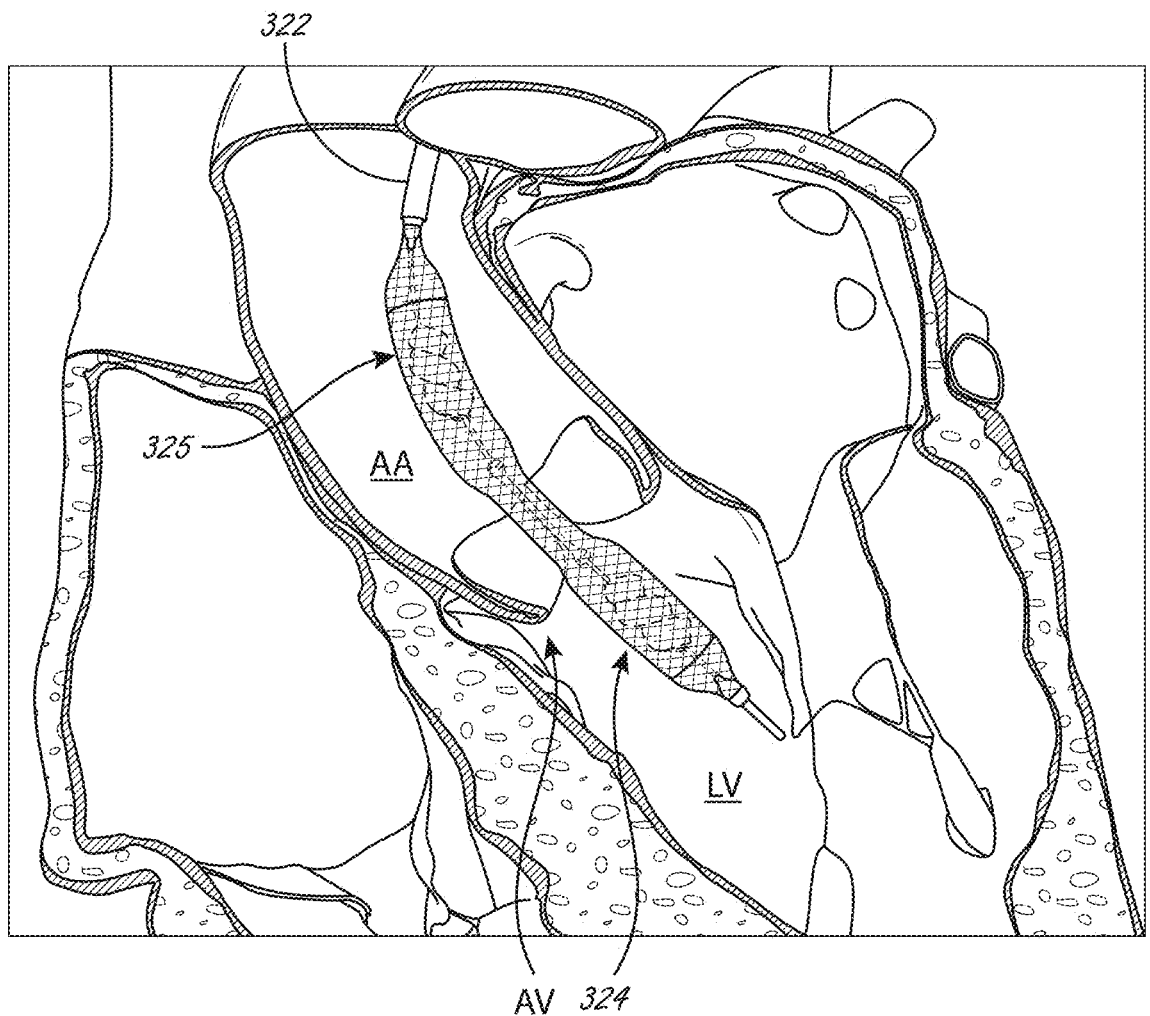
Figure 10F:
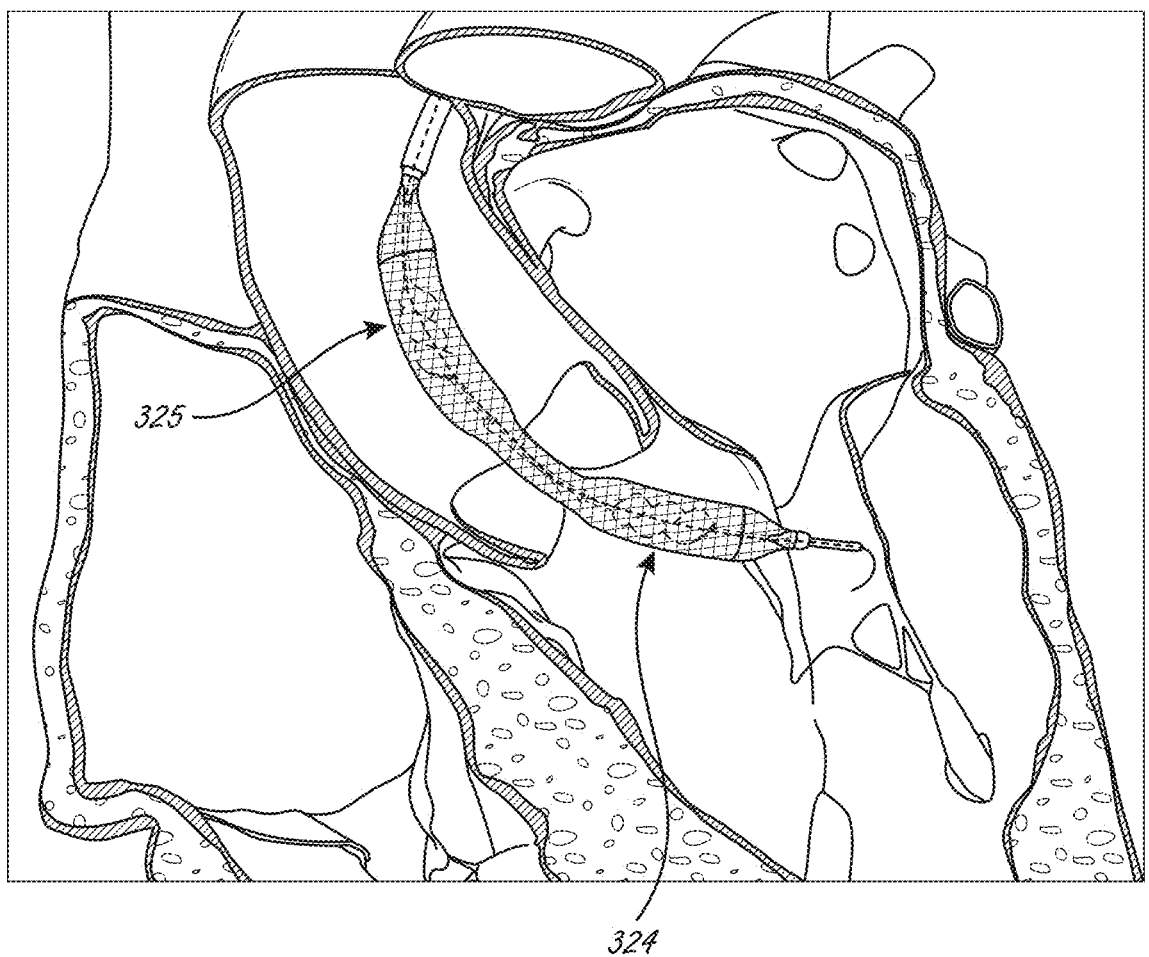

The second wire (e.g., an 0.018" guidewire) may then be moved prior to operation of the pump assembly (see FIG. 10E). If desired or needed, the pump portion can be deflected (active or passively) at one or more locations as described herein, as illustrated in FIG. 10F. As needed, the pump portion can be repositioned to achieve the intended placement, such as, for example, having a first impeller on one side of a heart valve and a second impeller on a second side of the heart valve. It is understood that in FIG. 10F, the pump portion is not in any way interfering or interacting with the mitral valve.

Any number of purge lines may then be attached to the proximal portion of the blood pump that is disposed outside of the patient. For example, fluid inlet(s) lines and fluid outlet(s) lines may be attached to one or more fluid ports on the proximal portion of the blood pump. A purge process can then be initiated to move fluid into the blood pump through at least one fluid pathway. One or more Confirmation steps can be performed to confirm the purge is operating as intended before turning on the pump. The pump assembly can then be operated, causing rotation of the one or more impellers. Any one of flow rate(s), pressure(s), and motor operation can be monitored at any time.

Any text that might appear in any figures is understood to be illustrative but exemplary, and does not necessitate that any particular component needs to be included in the embodiment.

The disclosure also includes catheter blood pumps that include one or more sensors thereon or therein, their methods of manufacture, and use. For example only, any blood pumps herein may include one or more sensors configured to sense pressure. A sensor configured to sense blood pressure may be included on an intravascular blood pump for a variety of purposes, such as, for example without limitation, estimating flow or detecting the position of the blood pump. Additionally, for example, one or more sensors may be axially spaced apart (e.g., one near an inflow and one near an outflow) and used to determine a differential pressure across the pump portion.

Figure 11:
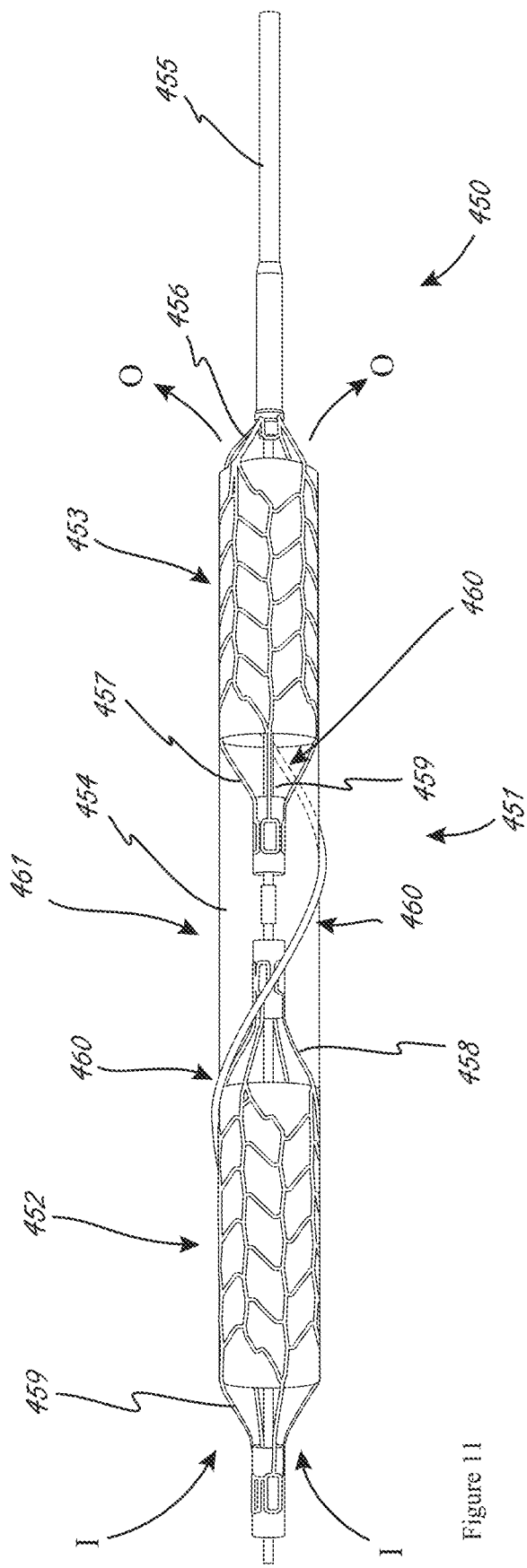
FIG. 11 is a side view of an exemplary pump portion that includes a sensor wire.

FIG. 11 illustrates an exemplary catheter blood pump 450 including an expandable and collapsible pump portion 451 (shown expanded or deployed) disposed distally relative to an elongate body 455, the pump portion including an expandable impeller housing 461 that includes a blood conduit that defines a blood lumen between an inflow "I" and an outflow "O". The pump portion includes one more impellers, any of which may at least partially be disposed axially within the fluid lumen (impellers are not shown in FIG. 11 for clarity). Expandable impeller housing 461 includes a sensor wire housing 460 extending at least partially along a length of the expandable impeller housing. Pump portion 451 also includes a sensor wire (e.g., a fiber optic) secured to a sensor, with the sensor wire housing secured relative to the expandable impeller housing. The sensor wire is disposed within the sensor wire housing 460, and the sensor wire may be sized such that it floats within a sensor wire lumen defined by the sensor wire housing. As used herein, a sensor wire housing generally defines a sensor wire lumen, in which a sensor wire may be disposed. This disclosure may, however, use the phrases sensor wire lumen and sensor wire housing interchangeably, however, the lumen is generally considered the space within a structural housing. Expandable impeller housings herein may also be referred to as expandable housings herein.

In the embodiment in FIG. 11, sensor wire housing 460 (which defines a lumen therein) has a helical configuration along at least a portion of the expandable housing 461, and it may have a helical configuration along as at least 50% of a length of the expandable housing, 55%, 60%, 65%, 70%, 75%, 80%, 85%, 90%, 95%, or 100% of a length of the expandable housing.

The sensor wire housings herein may have a linear configuration along at least a portion of the expandable housing, such as at least 50% of a length of the expandable housing, 55%, 60%, 65%, 70%, 75%, 80%, 85%, 90%, 95%, or 100% of a length of the expandable housing.

The sensor wire housings herein may have a helical configuration along a portion of its length, and may have linear or other configurations along other portions of its length. The sensor wire housings herein may have helical configurations in one or more discrete axially spaced helical regions, and optionally may have linear configurations in one or more discrete axially spaced linear regions. Sensor wire housings may have other non-linear and non-helical configurations as well.

The sensor wire housings herein generally help protect the one or more sensor wires (e.g., fiber optic). Sensors wires (e.g., fiber optics) may be quite fragile and susceptible to breaking, especially when the pump portion is navigated through curved vasculature and bends. Sensor wire housings herein can be sized relative to the sensor wire such that the sensor wire may float within the lumen, which may provide space for the wire to move slightly while the pump portion is navigated and/or in use, which may reduce the likelihood of sensor wire breakage.

Figure 12:
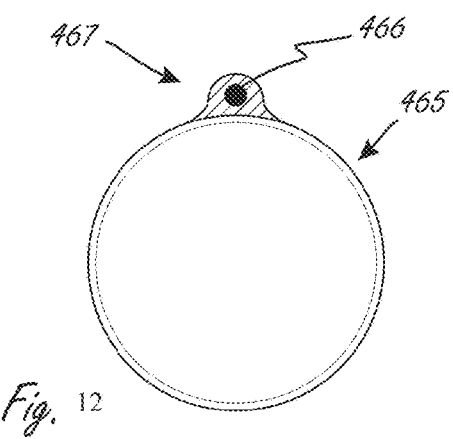
FIG. 12 is a cross sectional view of an exemplary expandable impeller housing that includes a sensor wire fixed to the expandable impeller housing.

In some embodiments, however, a sensor wire may be fixed relative to a impeller housing such that it is not floating with a space. When described as being fixed relative to an impeller housing, there may be some degree of slight movement provided between a sensor wire and impeller housing due to the flexibility of the materials, but fixed in this context refers generally to not freely floating within an open lumen. FIG. 12 provides an illustrative cross section of expandable housing 465 (details of which are not shown for clarity, but may include any features of any pump portion herein, such as a membrane, an expandable support member, and impeller, etc., exemplary details of which can be found elsewhere herein), with sensor wire 466 fixed relative thereto (not floating), and secured thereto by overlay 467, which may be deposited on the sensor wire to secure wire 466 relative to housing 465. The overlay 467 and sensor wire 467 may have any configuration along the length of the expandable housing, such as helical, partial helical, curvilinear, partial curvilinear, linear, partially linear, or any combination thereof.

Figure 13:
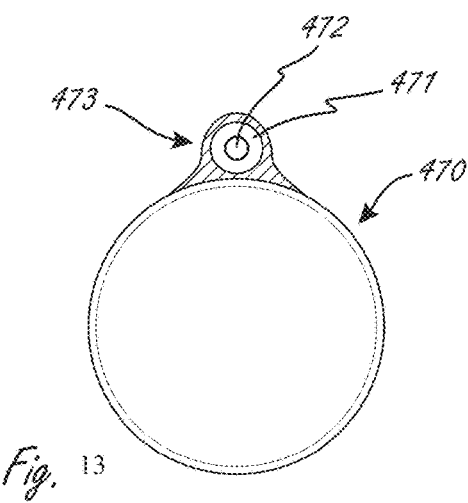
FIG. 13 is a cross sectional view of an exemplary expandable impeller housing that includes a sensor wire disposed in a sensor wire lumen.

FIG. 13 illustrates an exemplary cross section of exemplary expandable impeller housing 470 (again, details of which are not shown for clarity, but may include any feature of any pump portion herein, such as a membrane, an expandable support member, and impeller, etc., exemplary details of which can be found elsewhere herein). In this embodiment, the pump portion includes a sensor wire housing that defines a sensor wire lumen that is sized and configured relative to the sensor wire such that the sensor wire floats within the lumen along at least a portion of the expandable impeller housing. In any of the embodiments that include a sensor wire housing, the sensor wire may be fixed to the expandable housing at one more discrete locations, such as at locations where the sensor wire extends out of the sensor wire housing, such as at one or both of a proximal end or a distal end of a sensor wire housing. In the embodiment in FIG. 13, the pump portion includes a separate sensor wire housing that defines a sensor wire lumen 471. For example only, the sensor wire housing may be a hollow tubular element that extends along at least a portion of the expandable housing, such as a tube. The sensor wire housings herein, in the context of sensor wire lumens, may be a wide variety of materials, such as elastomeric or semi-rigid, or rigid. In any of the embodiments herein, the sensor wire housing may not impart a meaningful increase in rigidity to the expandable impeller housing at the location of the sensor wire housing, although there may be a slight increase in stiffness.

Any of the sensor wire housings herein that house a sensor wire may also have a non-circular cross sectional shape, such as rectilinear (e.g., triangular, rectangular, square), or curvilinear (e.g., oval), or any other non-defined, irregular, shape. In this exemplary embodiment, the sensor wire housing that defines lumen 471 is secured to the expandable housing 470 at least partially by overlay 473, and in this embodiment overlay 473 is disposed about a radially outermost portion of the sensor wire housing and lumen 471. The overlay 473 at least partially serves to help secure the sensor wire housing relative to the expandable housing. In this exemplary embodiment it may be a combination of the expandable membrane material of the housing 470 as well as overlay 473 that together surround the sensor wire housing and help secure it relative to the expandable housing 470. The membrane of the expandable impeller housing 470 is disposed radially within sensor wire housing, and overlay 473 is disposed about the sensor wire housing and lumen 471, including about a radially outmost portion of the sensor wire housing as shown. In any of the embodiments herein, the expandable housing 470 membrane may not be in direct contact with the sensor wire housing; there may be one or more layers of overlay material in between the two.

Any of the overlays herein may be different than an expandable housing membrane in one or more ways. For example, possible differences herein in this context include, for example, one or more of chemical structure, durometer, stiffness, and thickness. For example, an overlay is considered different than a conduit membrane in this context if the overlay is the same material as a membrane, but has a different durometer. Additionally, for example, an overlay is considered different than a impeller housing membrane in this context if the overlay is the same material as a membrane, but has a different thickness than the membrane.

In any of the embodiments herein, an overlay may comprise a polymeric material, optionally a urethane, and optionally polycarbonate based. In any of the embodiments herein, a membrane that at least partially defines a blood flow lumen may comprise a polymeric material, optionally a urethane, and optionally polycarbonate based. In any of the embodiments herein, the membrane may have the same chemical structure as the overlay.

Figure 14:
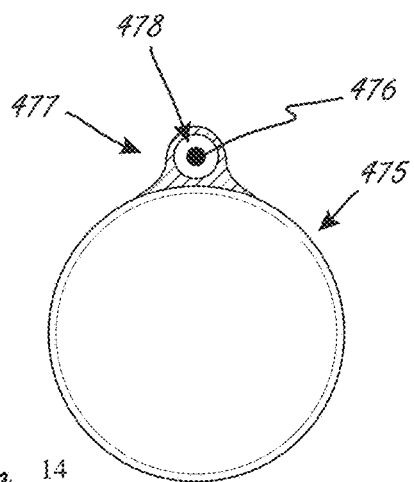
FIG. 14 is a cross sectional view of an exemplary expandable impeller housing that includes a sensor wire disposed in a sensor wire lumen.

FIG. 14 illustrates an exemplary embodiment in which a sensor wire lumen 478 is not defined by a separate structural sensor wire housing, such as in the embodiment of FIG. 13. In the example of FIG. 14, lumen 478 is defined by a combination of overlay 477 and the expandable housing 475. By way of example only, the sensor wire lumen in FIG. 14 may be created by creating a pump portion as shown in FIG. 13 (whether the sensor wire 472 has been positioned as shown or not), and then removing the sensor wire housing to thereby create lumen 478 now defined by overlay 477 and the expandable housing 475. In some embodiments the overlay may comprise one or more polymeric materials, and the wire lumen may be defined by one or more polymeric materials. Expandable housing 475 may, again, include any feature of any expandable housing herein, such as a membrane, an expandable support member, and impeller, etc., exemplary details of which can be found elsewhere herein. Sensor wire 476 is shown floating in lumen 478.

Figure 15:
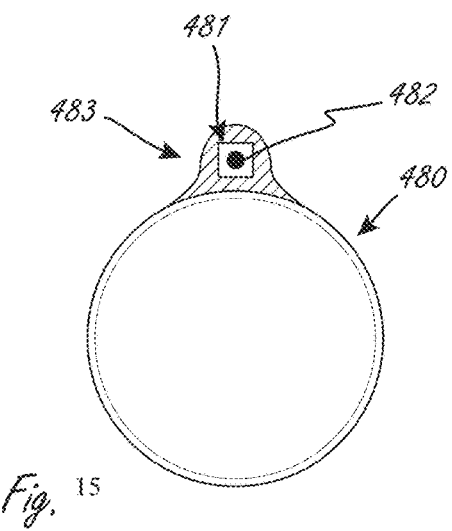
FIG. 15 is a cross sectional view of an exemplary expandable impeller housing that includes a sensor wire disposed in a sensor wire lumen.

FIG. 15 illustrates an exemplary cross section of an embodiment of an expandable housing 480 (again, impeller not shown for clarity) that includes sensor wire 482 floating within lumen 481, wherein lumen 481 has a non-circular cross section. In this embodiment, the cross section is rectilinear (e.g., rectangular, square). The cross section can be created by first positioning a rectilinear structure element over the expandable housing 480, then removing it after overlay 483 has been deposited on top of it, similar to the description of FIG. 14. Lumen 481 may be also defined by a sensor wire housing structural member that is secured with overlay 483.

Figure 16:
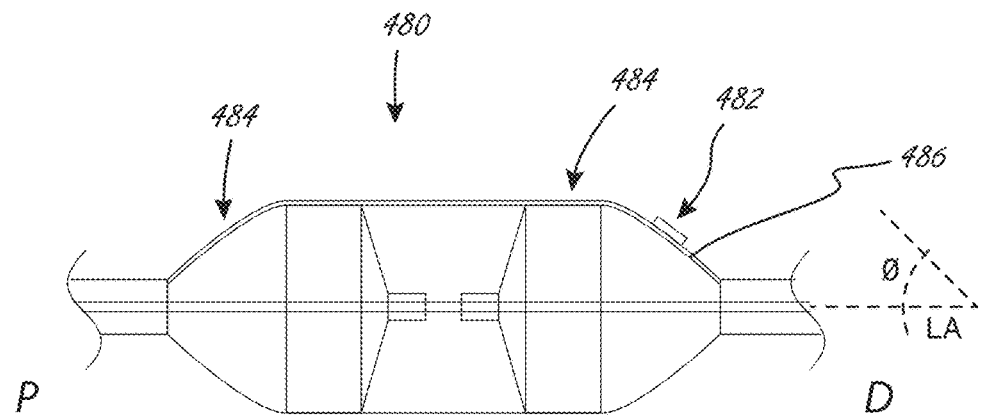
FIG. 16 is a side view of an exemplary pump portion that includes a sensor wire carried by and outside of an expandable impeller housing, the pump portion including a sensor coupled to the sensor wire.

FIG. 16 is a side view of a pump portion that includes an exemplary expandable impeller housing 480 that includes sensor 482 coupled to the expandable housing 480, and sensor wire lumen 484 (and a sensor wire therein) extending in a linear configuration along the expandable housing. Sensor wire lumen 484 may be any of the wire lumens herein. Expandable impeller housing 480 may be any of the expandable housings herein, including any that include more the one impeller, and any that include one or more expandable support members that help provide structural support to the expandable housing.

In FIG. 16, sensor 482 (which may be a pressure sensor) is secured to a distal strut 486 of the expandable housing, wherein the strut is near the inflow of the pump portion. Strut 486 may be any of the struts described herein or in any reference incorporated herein by reference. The sensors herein may be directly or indirectly secured to one or more expandable portion reinforcing elements (e.g., a struts, or an element of a scaffold). In this embodiment, the sensor is secured to an element (e.g., a strut) extending radially inward relative to a portion of the expandable housing at least partially surrounding an impeller. Any of the sensors herein can be coupled to an element with this configuration.

In this embodiment (and any embodiment herein), the sensor is secured such that a pressure sensitive area of the sensor is not orthogonal to a longitudinal axis of the expandable housing, and is optionally between 1 and 89 degrees relative to the longitudinal axis, such as from 5-85 degrees, such as from 10-80 degrees. The reference angle theta is shown in FIG. 16.

In any of the embodiments herein, the sensor wire extends along the expandable housing and is in communication with a proximal region of the blood pump that is spaced to remain outside of a patient when the impeller is in use. Information sensed from the one or more sensors can be used for one or more of the following: estimating flow, and detecting the position of the blood pump. Additionally, one or more sensors may be axially spaced apart (e.g., one near an inflow and one near an outflow, not shown), and used to determine a differential pressure across the pump portion.

The disclosure herein also describes methods of manufacturing pump portions of intravascular blood pumps. The methods of manufacturing can include creating a sensor wire lumen in the pump portion. Exemplary methods are described in the context of FIGS. 11-17. Exemplary methods can include creating a tubular substrate layer, positioning an elongate shaft having a hollow lumen on top of and extending along at least a portion of the tubular substrate layer, and depositing an overlay (e.g., 473, 467, 477, 483) on the elongate shaft and on the tubular substrate layer along substantially an entire length of the elongate shaft to thereby surround the elongate shaft with the overlay.

Figure 17:
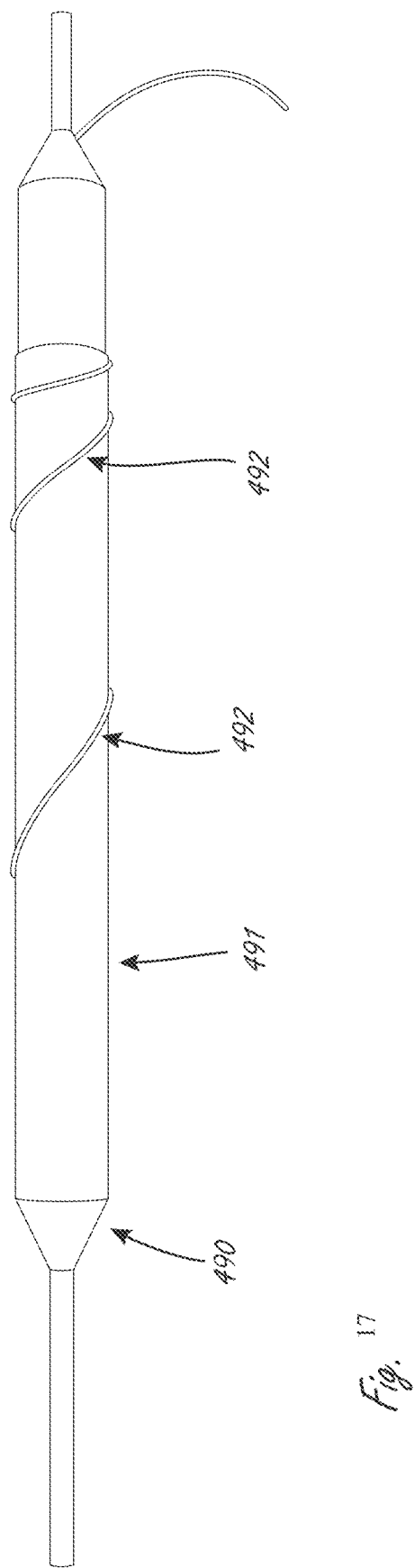
FIG. 17 illustrates an exemplary step in an exemplary method of manufacturing a pump portion.

FIG. 17 illustrates an exemplary step in which tubular substrate layer 491 has been created on mandrel 490 (e.g., by deposition). Tubular substrate layer 491 may be a wide variety of materials, such as an elastomeric material, a semi-rigid material, or a rigid material. In some embodiments, tubular substrate layer 491 comprises a polymeric material, and for example without limitation, a polycarbonate based urethane. Creating a tubular substrate layer may include spray deposition of a softened polymeric material on a mandrel (e.g., 490), and allowing it to harden as it cools.

An elongate shaft 492 defining a lumen therein may then be positioned on top of the tubular substrate layer 491, optionally in a helical and/or linear configuration, optionally in one or more discrete helical sections and/or one or more linear sections, and maintained in that configuration using any of a wide variety of techniques, such as by applying an adhesive (e.g., tape) to end sections axially outside of the tubular substrate layer.

Material (e.g., 473, 467, 477, 483) may then be deposited on and around elongate shaft 492 such that it overlays the elongate shaft. Depending on the material, it may be allowed to harden as it cools. For example, the material may be a material that becomes soft when heated and hardens when cooled, such as a thermoplastic. The overlay material can be any of the exemplary materials described herein, and can have any of the exemplary properties described herein.

In any of the embodiments herein, the overlay may be deposited only in the region of the elongate shaft (e.g., 473, 467, 477) such that the overlay has the same configuration as the elongate shaft along the tubular substrate layer. One exemplary method to do this is masking the region where the overlay material is not to be deposited (e.g., masking all but a helical or linear region where the elongate shaft is located). In any of the embodiments herein, however, the overlay made be deposited over the entire tubular substrate (including the elongate shaft), essentially creating an additional tubular layer of material.

If the elongate shaft (e.g., tubular shaft) is to be left in place (e.g., as in FIG. 13), a sensor wire may then be advanced into the wire lumen defined by the elongate shaft, in which case the elongate shaft is considered to be a sensor wire housing as that phrase is used herein. For example, a proximal end of a fiber optic can be loaded into a distal end of the lumen to avoid having to advance a sensor through the lumen. To help facilitate positioning the sensor wire in the lumen, the sensor wire may be coupled to a stiffer guiding element, and the guiding element can be fed first into an end of the lumen, through the lumen, and out of the other side, and then the guiding element can be retracted from the other side, also causing the sensor wire to be pulled into the lumen. The guiding element may then be decoupled from the sensor wire.

If the elongate shaft is to be removed during the manufacturing process (e.g., FIG. 14), the elongate shaft may be removed prior to positioning the sensor wire in the lumen. The sensor can be advanced into the lumen, and it may be advanced into the lumen using the guiding element concepts described above.

Any of the methods herein can include securing the sensor to one or more reinforcing elements of the pump portion, such as to a strut (e.g., FIG. 16). The sensor can be attached directly (e.g., physically engaging) or indirectly to the one or more reinforcing elements.

Any of the methods herein can include securing a second sensor to the pump portion at or adjacent to the outflow portion. For example, a second sensor can be secured to a reinforcing element of the pump portion, such as a proximal strut, or to any portion of the elongate shaft (e.g., 455 in FIG. 11) that extends proximally from the pump portion. The second sensor may be coupled to a sensor wire that may or may not be in a second wire lumen. In any embodiment herein, the second sensor wire may be fixed to the pump portion, while the first (e.g., distal) sensor wire may be allowed to float in a lumen.

The disclosure herein includes blood pumps that can include one more inflatable members, which may facilitate one or more functions. Inflatable members may also be referred to herein as inflatables. In some exemplary embodiments, an inflatable member may be inflated to at least partially assist in expanding an expandable impeller housing. In some exemplary embodiments, an inflatable member may be inflated to provide radial support along at least a portion of the expandable impeller housing, which may help maintain a tip gap between an impeller blade and a blood lumen conduit. In some embodiments, an inflatable may also function as a housing for a structural component (i.e., not fluid). In some examples an inflatable may house therein a part of a sensor system, such as a sensor wire (e.g., a sensor wire coupled to a sensor). Any of the inflatable members herein may be adapted to provide more than one of these functions, or other functions provided herein by an inflatable member. Any of the expandable impeller housings herein may include or incorporate any of the inflatable members described herein.

Figure 18A:
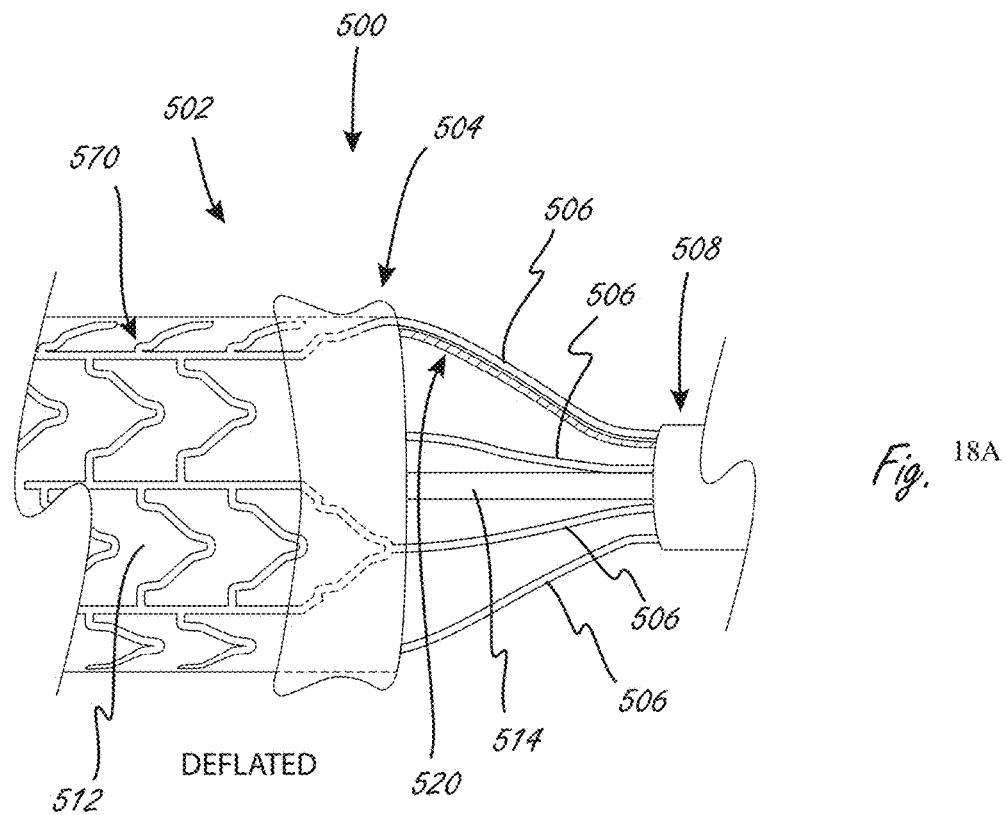
FIG. 18A illustrates an exemplary expandable pump portion including an inflatable, the inflatable in an uninflated configuration.
Figure 18B:
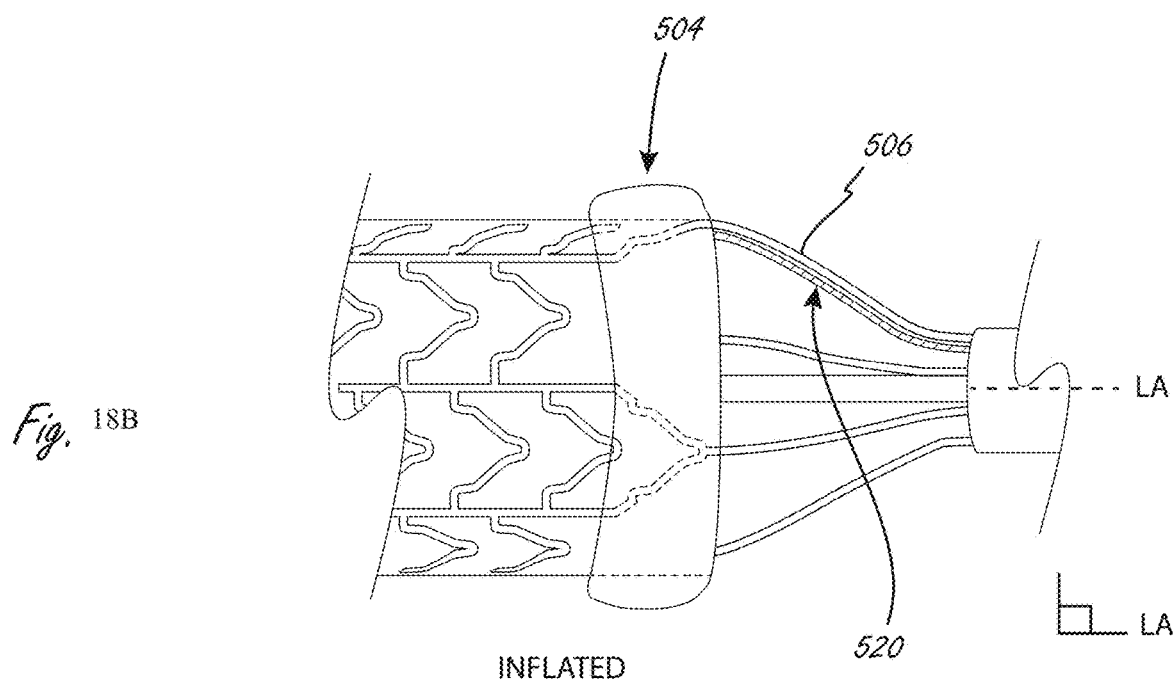
FIG. 18B illustrates an exemplary inflatable in an inflated state or configuration.

FIG. 18A illustrates an exemplary region of portion of catheter blood pump 500, which includes expandable impeller housing 502, which may be any of the expandable impeller housings herein. Expandable impeller housing 502 includes an expandable conduit that defines a blood lumen. Expandable housing 502 includes expandable support member 570 secured to a membrane 512, the expandable support member providing radial support to the membrane and defining the blood lumen. Membrane 512 may comprise one or more layers of materials secured together. While not shown, at least one impeller is disposed in expandable impeller housing 502. Optional struts 506 are shown, as is central drive mechanism 514. Elongate shaft 508 extends proximally from the expandable impeller housing, although alternatively the distal direction may be to the right in FIG. 18A. Inflation lumen 520, which is secured to and has a configuration that follows the configuration of a strut 506 in this embodiment, is in fluid communication with inflatable 504 so that a fluid (e.g., liquid, gas) may be advanced from within an external fluid source and/or fluid pump (not shown), through inflation lumen 520, and into inflatable 504 to inflate inflatable 504. Fluid delivery to any of the inflatables herein may be manually delivered and/or automatically controlled in any embodiment herein. FIG. 18A illustrates an inflatable in a uninflated configuration, and FIG. 18B shows inflatable 504 in an inflated, which may also be expanded relative to the uninflated configuration. When inflated the internal fluid pressure increases relative to the uninflated configuration.

In some examples, an inflatable (e.g., inflatable 504) may be disposed at one or both ends of a blood conduit of an expandable impeller housing, as shown, and one or more inflatables may be disposed in between ends of the blood conduit. After inflation, the inflatable member may provide radial support to the expandable impeller housing, which may help maintain tip gap between one or more blades and the blood conduit wall, particular in an impeller region of the impeller housing. Once inflated, the stiffness of the inflatable member may increase, providing radial support to the expandable impeller housing. Once inflated, the inflatable member may help provide and/or maintain circularity to the expandable impeller housing at the location of the inflatable. An expandable impeller housing may have one or more inflatables along its length, such as from one to fifty. Any number of inflatable members 504 may be included along the length of the blood conduit as may be desirable to increase radial support at one or more particular locations.

For example, the expandable housing may include inflatable members at one or both ends of one or more expandable support members surrounding an impeller, which are described elsewhere herein.

FIGS. 18A and 18B illustrate an example of an inflatable member that does not form/define the entirety of an inner surface of a blood conduit of an expandable impeller housing. In FIGS. 18A and 18B, in fact, the inflatable member does not form any of the inner surface of the blood conduit.

FIGS. 18A and 18B illustrate an example of an inflatable member that has a annular configuration, and is linear in a side view. FIGS. 18A and 18B are also an example of an inflatable member that is disposed orthogonally to a longitudinal axis of the blood conduit, with the relevant angle shown at the bottom of FIG. 18B.

FIGS. 18A and 18B illustrate an example of an inflatable member that is disposed at one of a proximal end or a distal end of a blood conduit.

Inflatable members 504 are also examples of annular inflatable members.

Figure 20:
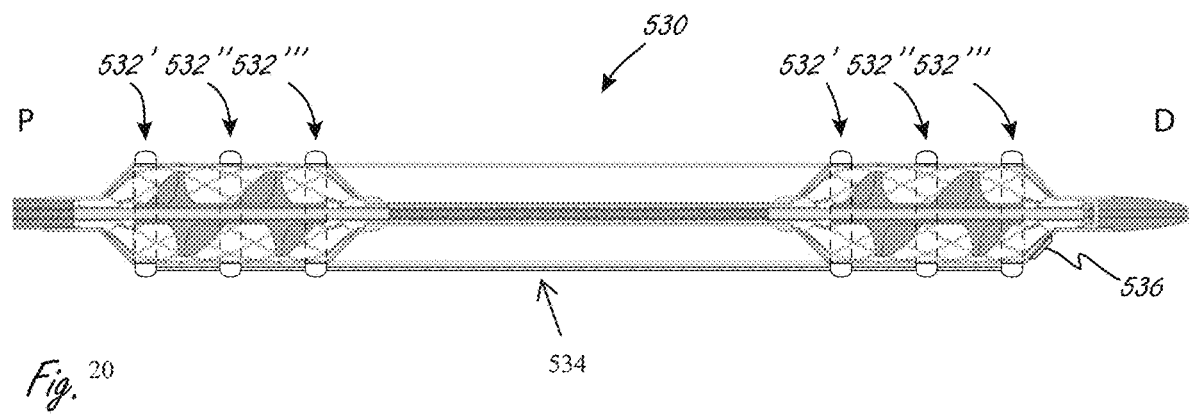
FIG. 20 is a side view of an exemplary pump portion that includes one or more inflatables that provide radial support to an expandable impeller housing.

FIG. 20 illustrates an expandable impeller housing 530 showing illustrative locations of one or more inflatable members. Optional inflatable members 532' are disposed at proximal ends of expandable support members. Optional inflatable members 532''' are disposed at distal ends of expandable support members. Optional inflatable members 532'' are disposed in between ends of the conduit, and between ends of expandable support members. FIG. 20 illustrates how one or more inflatables may be included in the expandable impeller housing, and may be positioned to provide radial support at one or more desired locations along the length of the conduit, such as at impeller regions to provide radial support.

FIG. 20 also illustrates optional fluid lumen 534, which extends axially and in this embodiment has a linear configuration, and may fluidly connect one or more of the inflatable members 532. In this example, fluid lumen 534 extends along the length of the inflatable member region of the blood conduit. The expandable impeller housing may also include a fluid lumen similar to inflation lumen 520 in FIGS. 18A and 18B to connect the one or more inflatable members with a fluid source (not shown) in a proximal region of the blood pump. Inflation lumen 534 may also house therein a sensor component such as a sensor wire, such as is shown in FIGS. 11-17 and described in more detail elsewhere herein. Optional sensor 536, which may be coupled to the sensor wire, may be coupled to a distal strut as shown. Any other aspect of any expandable housing herein may be included in expandable housing 530, and can be expressly incorporated by reference into FIG. 20. Fluid lumen 534 may be curvilinear, linear, helical, or any combination thereof. It may have one or more axially spaced sections with different configurations. For example without limitation, it may transition from a linear configuration to a helical configuration in a central region, back to linear. The pump portion may also include any number of axially extending fluid lumens 534.

If inflatable members are in fluid communication, they may also be considered to be a single inflatable, even if some embodiments herein describe them as separate inflatables. For example, all of the inflatables 532', 532'', 532''' and lumen 534 may be considered to a single inflatable if they are all in fluid communication.

Figure 19A:
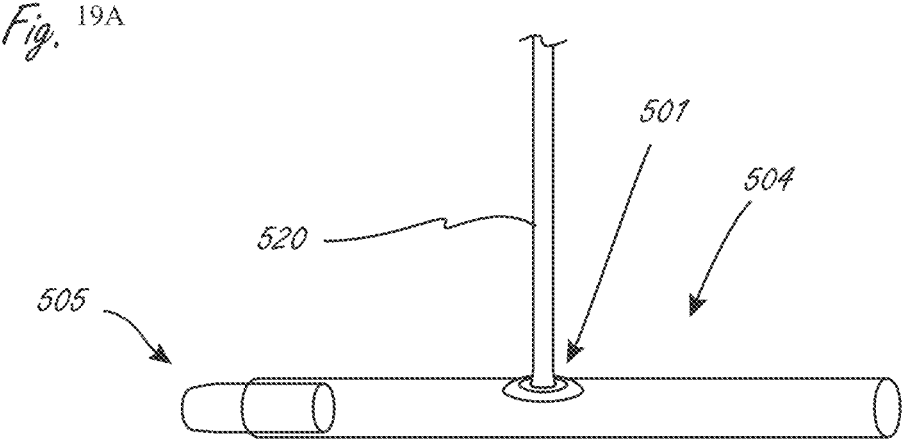
FIGS. 19A and 19B illustrate exemplary method steps in manufacturing an exemplary inflatable.
Figure 19B:
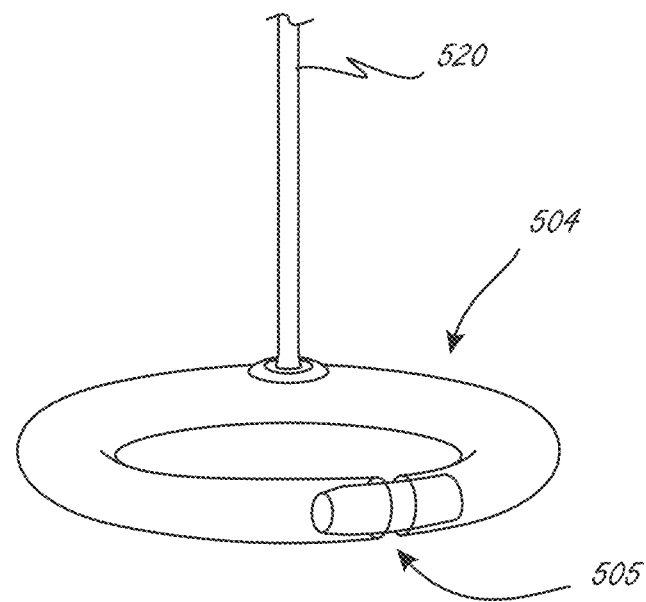

FIGS. 19A and 19B illustrate an exemplary method of making an annular shaped inflatable member, such as inflatable member 504 and 532'-532'''. A tubular member 504 may be provided with two ends, into one of which a joining tube 505 may be inserted as shown in FIG. 19A. The other end of tube 504 is curled or wrapped around and over the joining tube 505, and adhesive that has been applied to the ends of tube 504 secures the ends together. A side aperture may be created along the length of the tube 504 in the side, and a separate inflation tubing 520 can be secured (e.g., with adhesive) into the side aperture, to create an inflation lumen for the inflatable member. The inflation tube 520 can be put into fluid communication (optionally with one or more connections) with a fluid source at a proximal end of the blood pump. The annular inflatable may be then be coupled to the expandable impeller housing.

Figure 21:
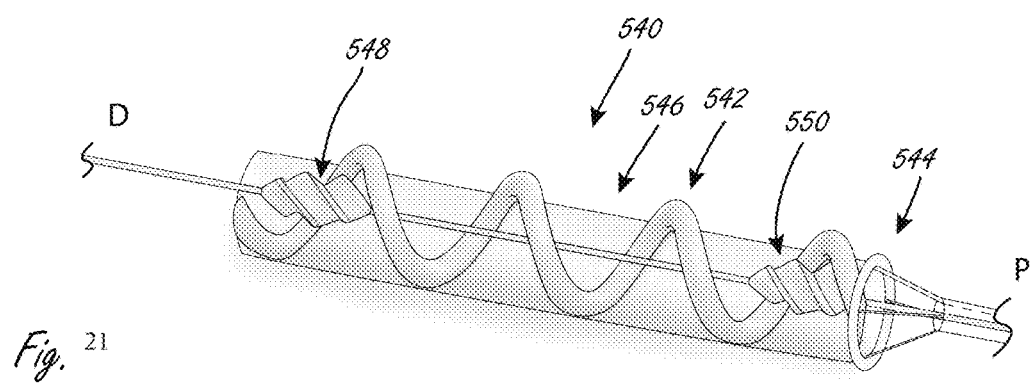
FIG. 21 is a perspective view of an exemplary pump portion that includes one or more inflatables that provide radial support to a blood conduit.

FIG. 21 illustrates an exemplary expandable housing 540 that includes a helical inflatable member 542, which can extend along any length of the expandable conduit 546. Optional distal impeller 548 and optional proximal impeller 550 are shown. Optional orthogonally oriented inflatable member 544 is shown at a proximal end of the blood conduit, but the expandable impeller housing may include any number of inflatable members and at a variety of locations, similar to that shown in FIG. 20, any of which may which in fluid communication, in which case those that are in communication are considered a single inflatable member.

FIG. 21 also illustrates an expandable impeller housing with a blood conduit that can be transitioned to an expanded configuration by inflating one or more inflatable members. For example, the helical inflatable member and/or one or more orthogonally oriented members may cause the blood conduit to expand to a fully deployed configuration (e.g., cylindrical). Alternatively to FIG. 21, an expandable impeller housing may have solely orthogonally oriented inflatable members that cause the conduit to expand to the fully expanded configuration. Alternatively, in an alternative, the expandable impeller housing from FIG. 20 may not include expandable support members around each impeller. FIG. 21 thus further illustrates an exemplary expandable housing in which one or more inflatable members can be used to expand the blood conduit, as well as provide radial support to one or more regions of the expandable housing when inflated.

FIGS. 20 and 21 illustrate inflatable members disposed between a proximal end and a distal end of the conduit.

FIGS. 18A, 18B, 20 and 21 illustrate inflatable members disposed at a first end of an expandable support member in which an impeller is at least partially disposed.

FIGS. 20 and 21 illustrate inflatable members that are axially spaced from other inflatable members.

FIG. 20 illustrates a blood pump that includes a first orthogonally oriented inflatable member at a proximal end of the conduit, a second orthogonally positioned inflatable member at a distal end of the conduit, a third orthogonally positioned inflatable member at a first end of a first expandable member in which the impeller is at least partially positioned, and a fourth orthogonally positioned inflatable member at a first end of a second expandable member in which a second impeller is at least partially positioned.

FIG. 21 illustrates an inflatable member that has a helical configuration along at least part of its length.

FIG. 21 is an example of an inflatable member that has a first region with a first configuration (e.g., annular, linear and orthogonal to a long axis), and a second region with a second configuration (e.g., helical), wherein the second configuration is different than the first configuration.

FIG. 20 is an exemplary of an expandable housing that comprises a plurality of inflatable members that are each adapted to be inflated, any one of which may be in fluid communication.

FIG. 20 is an example of at least two inflatable members that are in fluid communication with each other and with a first fluid source such that they can be inflated with a fluid disposed within the first fluid source (fluid source not shown but could be any fluid reservoir).

As an alternative to FIG. 21, the helical section and the orthogonally oriented section can be fluid communication with a fluid source, but may not be in fluid communication with each other. In this example, they would each have an inflation lumen coupled to the different regions. In this or any other embodiment, first and second inflation members can be in fluid communication with first and second fluid sources. This can allow for separate inflation, which can be helpful if, for example, different fluid pressure/stiffness was desired in different regions of the impeller housings. For example, it may be desirable to have an orthogonal, annular, inflatable member that is stiffer than a helical inflatable member in a central region of an expandable housing, for example without limitation.

FIGS. 18A-21 show examples of a blood conduit that includes a deformable membrane at least partially defining the lumen, wherein the membrane is secured (directly or indirectly) to any of the inflatable members.

FIGS. 18A-21 show examples of an inflatable member that does not form any part of an inner surface of the blood conduit (for example, a membrane surface forms the conduit).

FIGS. 18A-21 show examples of inflatable members that are disposed completely radially outside of a flexible membrane that at least partially defines a blood lumen.

FIGS. 18A-21 are examples of inflatable members that do not have a surface with a cylindrical configuration that extends along an entire length of the blood conduit.

FIG. 20 is an example in which a sensor component may be disposed in an inflatable member (e.g., 534), optionally wherein the sensor component floats within the inflatable member, and when inflated, the sensor component floats within the fluid. In various embodiments, the sensor component is free to move within a lumen of the inflatable member. The sensor component may be a sensor wire, optionally a fiber optic wire or a conductive wire.

FIGS. 20 and 21 are examples of an inflatable member that includes at least one non-orthogonally oriented section (e.g. axially linear, helical, or curvilinear), optionally wherein a second component is in the lumen.

FIG. 20 is an example of an the inflatable member that further includes one or more orthogonally oriented portions that are in fluid communication with the non-orthogonally oriented section in which a sensor component is disposed, wherein the one or more orthogonally oriented portions do no include a sensor component therein extending in the orthogonal direction. A sensor component may be disposed in at least one of the orthogonally oriented portions herein only where the orthogonally oriented portion couples (in fluid communication with) the non-orthogonally oriented portion.

Any of the fluids herein may be a gas or a liquid, for example. For example, one inflatable member may be inflated with a gas, and a second inflatable member may be inflated with a fluid.

In some alternative embodiments, an inflatable member forms a part of a fluid conduit (e.g., a dual-layered region of the fluid conduit that is in fluid communication with a fluid source), but does not form the entirety of the fluid conduit. For example, an inflatable member may comprise a generally cylindrical configuration (in at least part of the inflatable member), and an impeller may be at least partially disposed within the cylindrical configuration. In other embodiments, an inflatable member has two generally cylindrical axially-spaced regions, each of which has an impeller at least partially disposed therein. In embodiments in which a blood pump includes at least two axially-spaced cylindrical inflatable regions (which may form part of a fluid conduit; whether part of the same inflatable member or different inflatable members), a central region of the pump portion may extend between the two cylindrical regions, and wherein the central region may include or may not include an inflatable member. For example, a central region in between the two cylindrical regions may include an inflatable member that is at least one of linear, curvilinear, or helical, and may be in fluid communication with one or both of the cylindrical inflatable regions. Alternatively, the central region may not include an inflatable member, although it may include a fluid lumen that is in fluid communication with the one or more inflatable members axially spaced from the central region.

In some embodiments, an inflatable member forms a part of the blood conduit (e.g., a dual-layered region of the fluid conduit that is in fluid communication with a fluid source), and in another region of the pump portion, the inflatable member is also partially disposed on an outer surface of the blood conduit. For example, in some embodiments the pump portion includes a cylindrical inflatable section (e.g., in which any of the impellers herein is at least partially disposed) that forms a portion of the blood conduit, and axially adjacent to the cylindrical inflatable section the pump portion includes a second region that includes a non-cylindrical inflatable member that is one or more of on the blood conduit, embedded within the blood conduit, or within the blood conduit.

In any of the embodiments here, any of the inflatable members (or at least portions thereof) may be sandwiched between two layers of material (e.g., an inner layer and an outer layer). For example, any of the inflatable members in FIGS. 18A-21 may be sandwiched between an outer layer and an inner layer of material. Any of the inner layers in this context may form an inner surface of the blood conduit (or the inner layer may be a part of a composite of layers, an innermost layer of which forms an inner blood conduit surface). Any of the outer layers in this context may help smooth a transition to the inflatable member, which may help, for example, prevent the inflatable member from being caught on a distal region of a sheath or other device used in a resheathing/collapse process. Any of the outer layers in this context may extend over a portion of the length of the blood conduit, or they may extend over the entire length of the blood conduit. Any of the inner and outer layers (or composites of layers) in this context may include a variety of flexible materials, such as any of the membrane materials herein.

The disclosure herein also includes methods of deploying a blood pump that includes one or more inflatable members. The methods that follow can include any of the methods of deployment described herein. The pump portion can be advanced in a collapsed configuration within a fluid delivery device such as a sheath or other lumen. The method can include exposing an expandable impeller housing from within the delivery device, the expandable housing including a conduit and an inflatable member. The method can include exposing an impeller from within the delivery device so that the impeller is at least partially within the conduit, wherein the impeller may expand to at least some extent when exposed. The methods can also include delivering fluid from within a fluid source, along an inflation pathway, and into the inflatable member to inflate the inflatable member. In various embodiments, any of the methods herein can include collapsing the one or more inflatable members. In various embodiments, a vacuum is applied to remove fluid (or optionally gas in the case of a closed system) from the inflatable member. In any of the embodiments herein, the inflatable member can be inflated using a purge fluid from the console purge system. In these cases, the purge fluid pressure may be decreased to allow the inflatable member to collapse. In the case of certain expandable pumps as described herein, when the pump is collapsed by sheathing, the purge fluid can be pushed out of the inflatable member and into the waste line which allows the pump portion to collapse.

In various embodiments, the inflatable member may be inflated using a purge fluid and the inflatable member is configured as a lumen for the purge fluid. For example, the inflatable member may extend from a proximal end of the pump to a distal bearing to allow for purging of the distal bearing. In this manner, the inflatable member may perform several functions, e.g., housing the sensor wire, delving purge fluid, and adding structural support to the shroud/blood conduit.

In any of the methods, inflating an inflatable member can at least help expand the conduit, if not be a significant part of the conduit expansion process. For example, expandable support members (scaffolds) may or may not be included in the pump portion. For any method herein, inflating the inflatable member may increase radial support (increase stiffness) at the location of the inflated member, which may help maintain circularity of the lumen and thereby help maintain tip gap between an impeller blade and the conduit wall.

Any of the methods herein may include inflating a second inflatable member, which may be inflated with a fluid from a second fluid source or from the first fluid source.

As used herein, an inflatable member refers to an inflatable component, even if portions of it have different configurations.

Any of the methods herein can include inflating a tubular member that houses therein a sensor component, such a sensor wire (e.g., fiber optic).

Any of the inflatable members herein can be deflated using one or more techniques. For example, any of the inflatable members herein can be at least partially deflated by pulling a vacuum to at least partially remove fluid from within the inflatable member. In addition to or alternatively, any of the inflatable members herein can be at least partially deflated by applying one or more forces to the inflatable members to displace fluid therein towards a waste or fluid reservoir. For example, a shaft may be pushed distally over one or more inflatable members to apply force to the inflatable member(s) and push fluid out of the inflatable member. Additionally or alternatively, a radially inward force can be applied to the one or more inflatable members to push fluid out of the inflatable member(s). The one or more forces can be applied such that fluid is pushed towards a proximal end of the blood pump towards a waste device or fluid source.

Figure 22A:
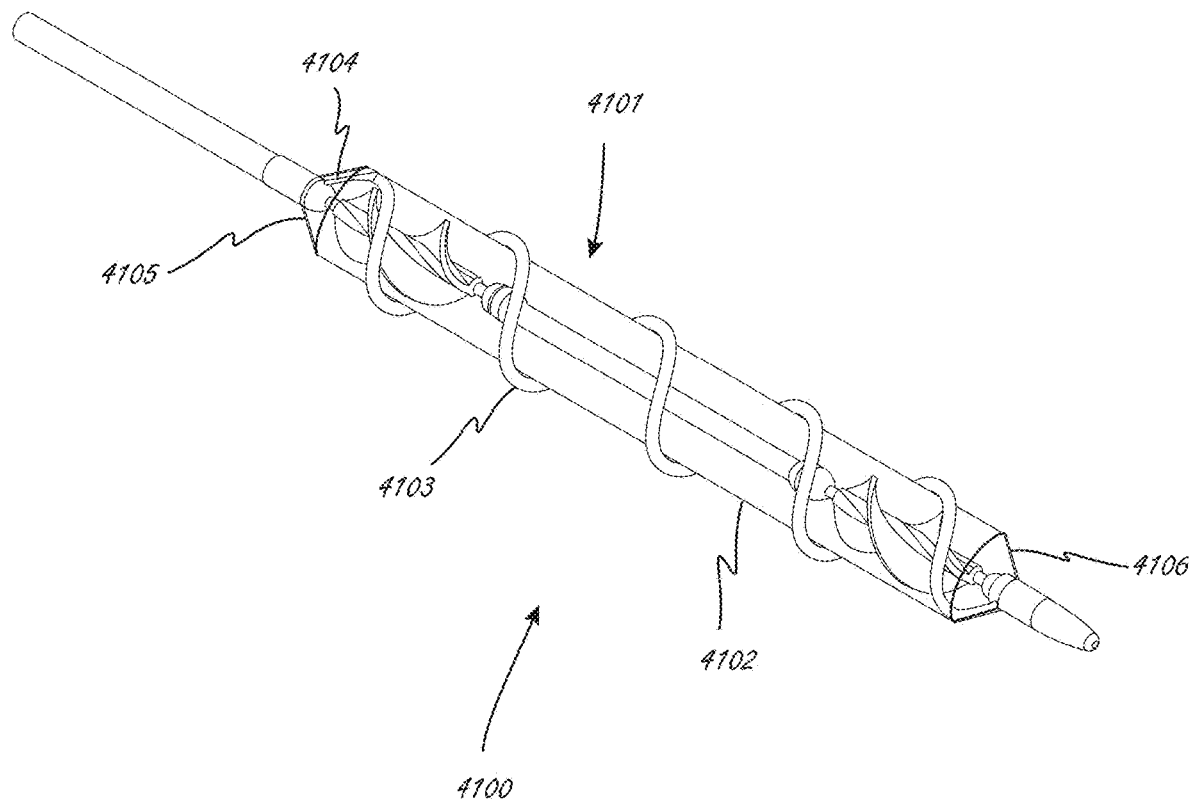
FIG. 22A is a perspective view of an exemplary pump portion that includes one or more inflatables that provide radial support to a blood conduit.
Figure 22B:
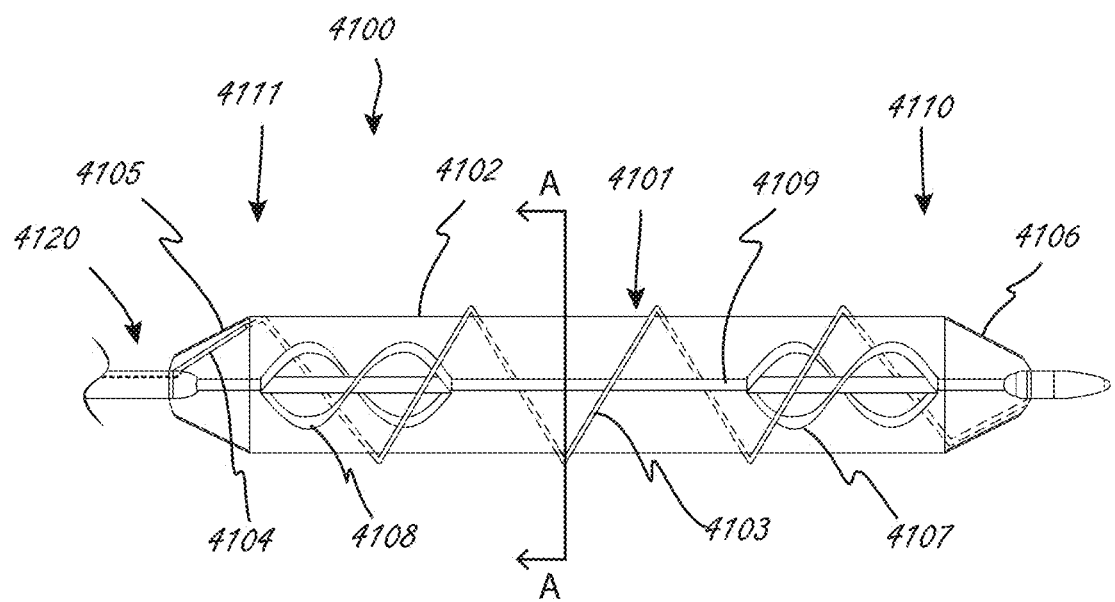
FIG. 22B is a side view of an exemplary pump portion that includes one or more inflatables that provide radial support to a blood conduit.
Figure 22C:
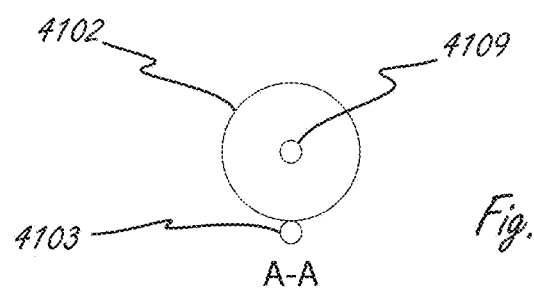
FIG. 22C is an end view of an exemplary pump portion that includes one or more inflatables that provide radial support to a blood conduit

FIGS. 22A-24 illustrate an exemplary pump portion of an intravascular blood pump, with FIG. 22C showing cross section A-A shown in FIG. 22B. The embodiment in FIGS. 20A-42 has similarities to the embodiment shown in FIG. 21, as can be seen. Pump portion 4100 includes an expandable impeller housing 4101, which includes an expandable and collapsible conduit through which blood is pumped by one or more impellers. Expandable housing 4101 includes a conduit 4102, which may in some embodiments be a relatively thin walled membrane, and which may have a cylindrical configuration, whose inner surface defines a lumen through which blood is pumped. Expandable housing 4101 also includes inflatable member 4103, which is secured to expandable conduit 4102. Inflatable member 4103 is in fluid communication with inflation pathway 4104, which extends proximally relative to expandable housing 4101. A section of inflatable pathway is secured to proximal strut 4105, as is shown in FIGS. 22A and 22B. The section of inflatable pathway 4104 that is secured to strut 4105 may also be inflatable, but is generally not considered part of the inflatable member 4103, which is secured to the expandable conduit and is inflated to facilitate the expansion of expandable conduit 4102.

FIG. 22C illustrates Section A-A shown in FIGS. 22A and 22B, including conduit 4102 that is secured to inflatable member 4103. In this embodiment, inflatable member 4103 is disposed radially outside of the inner surface of conduit 4102.

The conduit can be made from a variety of materials. For example, the conduits herein can comprise one or more of a polyurethane rubber, a silicone rubber, an acrylic rubber, an expanded polytetrafluoroethylene, a polyethylene, or a polyethylene terephthalate, including any combination thereof.

The inflatable member 4103 may be the same material as the conduit, or it may be a different material. Inflatable member 4103 can comprise one or more of a polyurethane rubber, a silicone rubber, an acrylic rubber, an expanded polytetrafluoroethylene, a polyethylene, or a polyethylene terephthalate, including any combination thereof.

Inflatable member 4103 is an example of an inflatable member that has a helical configuration along at least a section of its length. Inflatable member 4103 is an example of an inflatable member that has a helical configuration along its entire length. Inflatable member 4103 is an example of an inflatable member that does not form the entirety of an inner surface of the conduit. Inflatable member 4103 is an example of an inflatable member that does not form any portion of an inner surface of the conduit. Inflatable member 4103 is an example of an inflatable member that extends from a proximal end to a distal end of the conduit. Inflatable member 4103 is an example of an inflatable member that is disposed completely radially outside of a flexible conduit. Inflatable member 4103 is an example of an inflatable member that does not have a cylindrical configuration along the length of the conduit.

Inflatable member 4103 is an example of an inflatable lumen that is not parallel with a pump portion longitudinal axis over at least 50% of the length of the inflatable member, over at least 60% of the length of the inflatable member, over at least 70% of the length of the inflatable member, over at least 80% of the length of the inflatable member, and over at least 90% of the length of the inflatable member.

Inflatable member 4103 is also an example of a lumen secured to an expandable conduit, the lumen having a proximal end that is aligned with a proximal end of the expandable conduit, wherein the lumen has a configuration along its length that is not solely axial between the lumen proximal end and a lumen distal end. In this embodiment, a distal end of the lumen extends to the distal end 4110 of the conduit, and the proximal end of the lumen is aligned with (or at least substantially axially aligned with) the proximal end 4111 of the conduit.

The inflation pathway 4104 (which is in fluid communication with inflatable member) can be secured to a proximal strut 4105 using a variety of techniques, such as suturing and/or adhesive.

Figure 23:
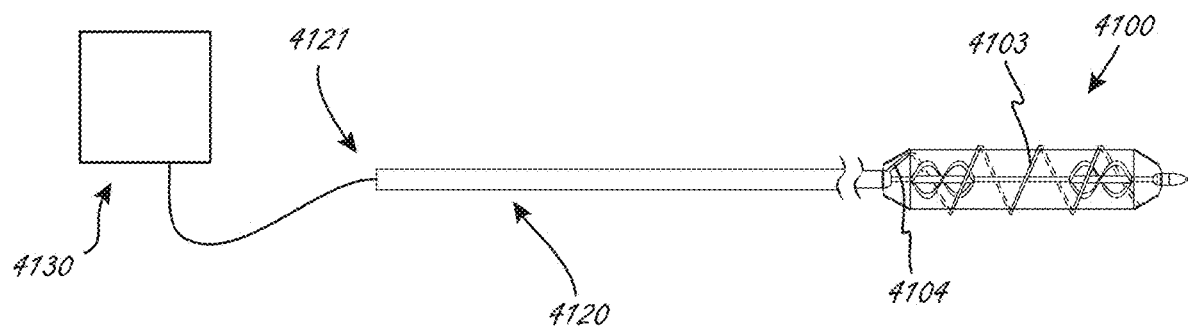
FIG. 23 illustrates an exemplary catheter blood pump.

FIG. 23 illustrates conceptually an external inflation fluid source 4130, which is in fluid communication with inflatable member 4103 via inflation pathway 4104. The inflation pathway 4104 can extend proximally from expandable conduit 4102, through catheter 4120, and into fluid communication with fluid source 4130. The inflation pathway 4104 inside catheter 4120 may comprise a fluid lumen that is created by one or more structural components, and as such need not be a single structural component extending from a distal end of the catheter to a proximal end of the catheter. The fluid source 4130 may be put into fluid communication with the inflation pathway 4104 at connection location 4121 where two lumens can be attached to create the fluid communication. The fluid reservoir may include a pump that is adapted and configured to deliver inflation fluid from the fluid reservoir, through the inflation pathway, and into the inflatable member.

The one or more impellers and the drive mechanism(s) that cause their rotation can be any of the impellers and drive mechanism(s) herein.

The helical inflatable member may be separately manufactured, then adhered to the collapsible and expandable conduit. For example, a conduit can first be advanced onto a mandrel. The helical inflatable member can then be positioned around the conduit and secured thereto using, for example, an adhesive and/or heat securing process. The inflation pathway may be secured to the inflatable member before or after the inflatable member is secured to the collapsible and expandable conduit.

The inflatable member can be inflated to cause the expandable conduit to assume a deployed configuration, creating the blood lumen. Any of the methods of use herein are expressly incorporated by reference herein for all purposes into the exemplary methods of use that follow. For example, pump portion 4100 can be deployed adjacent an aortic valve, such as is shown in FIG. 4. Methods of use and deployment of pump portion 4100 may incorporate by reference any of the methods of use and deployment herein.

Figure 24:
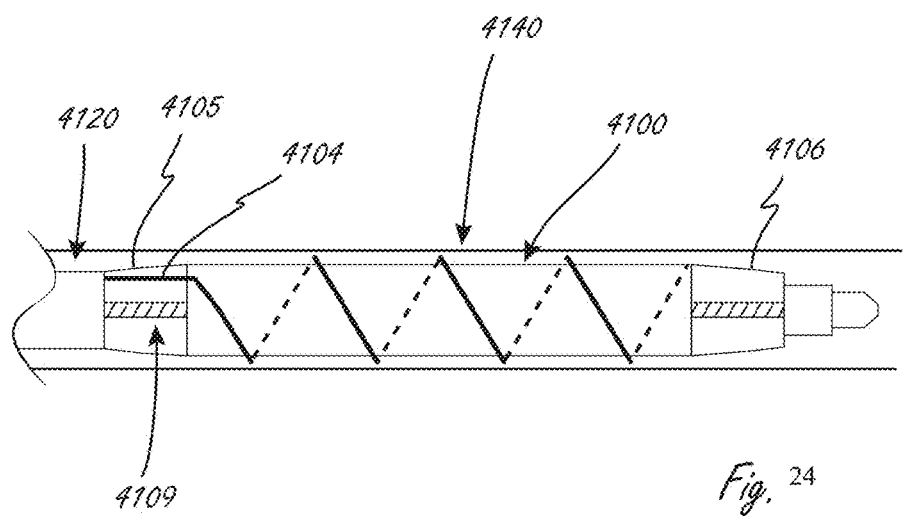
FIG. 24 illustrates an exemplary collapsed delivery configuration of a pump portion of an exemplary catheter blood pump.

FIG. 24 illustrates pump portion 4100 in a collapsed delivery configuration within sheath 4140. After pump portion 4100 has been advanced into proximity of a target location, sheath 4140 can be retracted relative to the pump portion, exposing the pump portion 4100 in the vicinity of the target location (e.g., aortic valve). A fluid can then be advanced from the fluid reservoir 4130, through the fluid pathway 4104, and into the inflatable member, to thereby inflate the inflatable member.

Inflation of the inflatable member increases the fluid pressure within the inflatable member, stiffening the inflatable member, causing the expandable conduit to expand toward the fully deployed configuration shown in FIGS. 22A and 22B. Once the expandable conduit has been reconfigured towards its fully deployed configuration, the one or more impellers may be activated to increase the flow of blood through the conduit. As shown in FIG. 22A, the inflatable member axially extends the pump portion where the impellers are located, and as such provides radial support to the conduit at the location of the impellers, as well as in a portion between the impellers. The inflatable member can also be incorporated into pump portions that include a single impeller. The inflatable members herein are positioned relative to the conduit such that delivering fluid to the inflatable member provides radial support to the conduit and causes the conduit to expand towards a deployed configuration such that blood can be pumped through the conduit. In some embodiments the inflatable member may be secured to the expandable conduit, and in some embodiments it may not be directly secured thereto.

FIGS. 25A-25C illustrate an exemplary embodiment of a pump portion 4160 of an catheter blood pump, which may be considered similar in some ways to the embodiments shown in FIGS. 18A-24. Pump portion 4160 includes one or more inflatable members (which may be referred to herein as inflatable elements or inflatables), and an expandable blood conduit. The one or more inflatable members are positioned relative to the expandable conduit such that, when inflated, the one or more inflatable members radially support the expandable conduit. Pump portion 4160 also includes two impellers (shown in phantom in FIGS. 25B and 25C) disposed at least partially within the expandable blood conduit, which are configured to pump blood when rotated. The impellers have one or more blades. The pump portion may include only one, or more than two impellers in alternative embodiments. The one or more inflatable members are in fluid communication with one or more fluid inflation pathways extending proximally relative to the expandable housing towards one or more fluid sources (see FIG. 23).

Pump portion 4160 is an example of a pump portion in which one or more inflatable members, when inflated, are configured and positioned relative to the blood conduit such that more radial support is provided at the location of the impeller(s) from the inflatable(s) than at a non-impeller region (which may be referred to as a region that is axially-adjacent to an impeller region). For example, the one or more inflatable members radially support expandable conduit 4162 more in impeller proximal region 4163 and in impeller distal region 4165 than in central region 4164, which is axially in between the two impellers. This may help provide more structural support at the region of the impeller(s), which may help maintain tip gap between edges of impeller blades and the blood conduit. Providing less radial support in central region 4164 may help maintain a certain degree of flexibility in the central region, which may help provide more flexibility where valve leaflets contact the pump portion (described in more detail herein and incorporated by reference into this section for all purposes), if the pump portion is positioned at such a location (see FIG. 10A-10F, for example). Additionally, it may simply not be as important to provide as much radial support in a non-impeller region as in an impeller region, and thus the inflatable member(s) can be configured and adapted such that they do not provide as much support in one or more non-impeller region(s) when inflated.

Pump portion 4160 includes one or more inflatable members that provide radial support to expandable conduit 4162. An inflatable member may include multiple sections that are provided herein with different reference numbers. For example, an inflatable member may be considered to be a combination of individually labeled inflatable members, and as such the combination of inflatable members may itself be considered a single inflatable member. For example, FIGS. 25A-25C illustrate inflatable members 4170, 4171, and 4172. However, 4170, 4171, and 4172 may also be considered to be part of the same inflatable member, in which case the figures are referring to sections 4170, 4171, and 4172 of single inflatable member.

In some instances, an individual inflatable member can be considered any and all sections of a pump portion that are in fluid communication with a single fluid source. For example, sections 4170 and 4171 may be in fluid communication with a single fluid source, and may be inflated simultaneously when fluid is delivered from the fluid source. And section 4172 may be in fluid communication with a second fluid source (and not in fluid communication with 4170 and 4171). In this example, sections 4170 and 4171 may be considered sections of a first inflatable member, while section 4172 may be considered a second inflatable member. This disclosure is thus illustrative and not intended to limit the definition of an inflatable member, and an inflatable member herein may in fact comprise other structural elements described as a separate inflatable member herein.

In the exemplary embodiment in FIGS. 25A-25C, helical sections 4170, 4171, and 4172, when inflated as shown, radially support conduit 4162. The configuration and placement of the different sections 4170, 4171, and 4172 is somewhat similar to a screw with multiple starts, in that the different sections have coiled configurations around the conduit with different start locations, such that they are axially apart around the conduit (even if physically touching an adjacent section of an inflatable member). The sections may be considered to be coiled and in between other inflatable sections. The sections are disposed in a pattern along their lengths (e.g., 4170/4171/4172, and repeating), and are not radially overlapping with each other in this embodiment.

In other embodiments there may only be a single impeller (e.g. a proximal impeller, or a distal impeller). In such instances there may only be a single region (e.g. region 4163 or region 4165) that provides greater radial support to the conduit than an axially-adjacent, non-impeller region.

The pitches of all three sections 4170-4172 are less in impeller regions 4163 and 4165 than in central non-impeller region 4164. The pitches gradually increase between the distal end of the proximal impeller and the middle of the conduit, and gradually decrease in the distal direction as the helical sections near the distal impeller, as shown. The pitches of any of sections 4170-4172 may be constant in at least a portion of impeller regions 4163 and 4165.

In an alternative embodiment, one or more impeller regions may each have a generally cylindrically shaped inflatable member that surrounds all or substantially all of the impeller, and a non-cylindrically shaped inflatable member may extend axially from the one or more cylindrically shaped inflatable members. For example, a pump portion may include one or more inflatable sections in a central region that have linear configurations and extend axially away from a cylindrically shaped inflatable member in an impeller region. Alternatively, a pump portion may include one or more inflatable sections in a central region that have helical configurations and extend axially away from a cylindrically shaped inflatable member in an impeller region. Alternatively, a pump portion may include one or more inflatable sections in a central region that have curvilinear (e.g, serpentine) configuration and extend axially away from a cylindrically shaped inflatable member in an impeller region. A pump portion may have more than one inflatable section in a central region that do not have the same general configuration as the other central region inflatable sections (e.g., one may be linear, one may be serpentine, one may have a different curvilinear configuration, etc.). Any of these sections may be considered part of the same inflatable member, a further discussion of which is described herein.

FIGS. 25A-25C illustrate a pump portion when one or more inflatable members are inflated (e.g., after deployment from a delivery device). Pump portion 4160 may be collapsed as described herein in reference to FIG. 24, the description of which is incorporated by reference herein for all purposes.

What is claimed is:

1. A catheter blood pump, comprising:
   an elongate shaft;
   an expandable pump portion extending distally from the elongate shaft, the pump portion including:
      an expandable impeller housing including an expandable blood conduit that defines a blood lumen between an inflow region and an outflow region;
      at least one impeller disposed at least partially within the blood lumen;
      a first sensor wire secured to the expandable impeller housing and extending from a proximal end of the expandable impeller housing to a distal end of the expandable impeller housing;
      a distal sensor coupled to the first sensor wire and disposed distal to a distal end of the expandable blood conduit;
      a proximal sensor disposed near the outflow region; and
      a second sensor wire coupled to the proximal sensor.

2. The catheter blood pump of claim 1, wherein the distal sensor and proximal sensor are configured to determine a differential pressure across the expandable pump portion.

3. The catheter blood pump of claim 1, wherein the proximal sensor is secured to a proximal strut of the expandable impeller housing.

4. The catheter blood pump of claim 1, wherein the proximal sensor is secured to the elongate shaft.

5. The catheter blood pump of claim 1, wherein the first sensor wire is secured to the expandable impeller housing such that it is disposed radially outside of the expandable blood conduit.

6. The catheter blood pump of claim 1, wherein the first sensor wire is disposed within a sensor wire lumen, the first sensor wire having a size relative to the sensor wire lumen such that it floats within the sensor wire lumen.

7. The catheter blood pump of claim 5, wherein the sensor wire lumen is defined by an inner surface of an elongate hollow shaft, the elongate hollow shaft secured to the expandable impeller housing.

8. The catheter blood pump of claim 6, wherein the elongate hollow shaft has a circular cross-sectional configuration.

9. The catheter blood pump of claim 1, wherein the first sensor wire extends in a helical configuration about at least a portion of the expandable impeller housing.

10. The catheter blood pump of claim 1, wherein the first sensor wire extends in a helical configuration along an entire length of the expandable impeller housing.

11. The catheter blood pump of claim 1, wherein the first sensor wire extends in a linear configuration along at least a portion of the expandable impeller housing.

12. The catheter blood pump of claim 1, wherein the first sensor wire extends in a linear configuration along an entire length of the expandable impeller housing.

13. The catheter blood pump of claim 1, wherein the first sensor wire extends in a helical configuration about a portion of the expandable impeller housing and extends in linear configuration along at least a portion of the expandable impeller housing.

14. The catheter blood pump of claim 1, wherein the first sensor wire extends proximally from the expandable impeller housing and is in communication with a proximal region of the blood pump that is positioned to remain outside of a patient when the impeller is operated.

15. The catheter blood pump of claim 1, wherein the first sensor wire is a fiber optic.

16. The catheter blood pump of claim 1, wherein the expandable impeller housing is stiffer in proximal and distal sections than in a central section in between the distal and proximal section.

17. The catheter blood pump of claim 15, wherein the central section includes a helical configuration.

18. The catheter blood pump of claim 1, wherein the at least one impeller is disposed near the outflow region.

19. The catheter blood pump of claim 1, wherein the expandable impeller housing includes one or more scaffold sections.

20. A catheter blood pump, comprising:
an elongate shaft;
an expandable pump portion extending distally from the elongate shaft, the pump portion including:
an expandable impeller housing including an expandable blood conduit that defines a blood lumen between an inflow region and an outflow region;
at least one impeller disposed at least partially within the blood lumen;
a sensor wire secured to the expandable impeller housing and extending from a proximal end of the expandable impeller housing to a distal end of the expandable impeller housing;
a distal sensor coupled to the sensor wire and disposed distal to a distal end of the expandable blood conduit;
a proximal sensor disposed near the outflow region and secured to the elongate shaft.

21. A catheter blood pump, comprising:
an elongate shaft;
an expandable pump portion extending distally from the elongate shaft, the pump portion including:
an expandable impeller housing including an expandable blood conduit that defines a blood lumen between an inflow region and an outflow region;
at least one impeller disposed at least partially within the blood lumen;
a sensor wire secured to the expandable impeller housing such that it is disposed radially outside of the expandable blood conduit and extending from a proximal end of the expandable impeller housing to a distal end of the expandable impeller housing;
a distal sensor coupled to the sensor wire and disposed distal to a distal end of the expandable blood conduit; and
a proximal sensor disposed near the outflow region.

22. A catheter blood pump, comprising:
an elongate shaft;
an expandable pump portion extending distally from the elongate shaft, the pump portion including:
an expandable impeller housing including an expandable blood conduit that defines a blood lumen between an inflow region and an outflow region;
at least one impeller disposed at least partially within the blood lumen;
a sensor wire secured to the expandable impeller housing and extending from a proximal end of the expandable impeller housing to a distal end of the expandable impeller housing, wherein the sensor wire is disposed within a sensor wire lumen, the sensor wire having a size relative to the sensor wire lumen such that it floats within the sensor wire lumen;
a distal sensor coupled to the sensor wire and disposed distal to a distal end of the expandable blood conduit; and
a proximal sensor disposed near the outflow region.

23. A catheter blood pump, comprising:
an elongate shaft;
an expandable pump portion extending distally from the elongate shaft, the pump portion including:
an expandable impeller housing including an expandable blood conduit that defines a blood lumen between an inflow region and an outflow region;
at least one impeller disposed at least partially within the blood lumen;
a sensor wire secured to the expandable impeller housing and extending from a proximal end of the expandable impeller housing to a distal end of the expandable impeller housing, wherein the sensor wire extends in a helical configuration about at least a portion of the expandable impeller housing;
a distal sensor coupled to the sensor wire and disposed distal to a distal end of the expandable blood conduit; and
a proximal sensor disposed near the outflow region.

24. A catheter blood pump, comprising:
an elongate shaft;
an expandable pump portion extending distally from the elongate shaft, the pump portion including:
an expandable impeller housing including an expandable blood conduit that defines a blood lumen between an inflow region and an outflow region;
at least one impeller disposed at least partially within the blood lumen;
a sensor wire secured to the expandable impeller housing and extending from a proximal end of the expandable impeller housing to a distal end of the expandable impeller housing, wherein the sensor wire extends in a linear configuration along at least a portion of the expandable impeller housing;
a distal sensor coupled to the sensor wire and disposed distal to a distal end of the expandable blood conduit; and
a proximal sensor disposed near the outflow region.

25. A catheter blood pump, comprising:
an elongate shaft;
an expandable pump portion extending distally from the elongate shaft, the pump portion including:
an expandable impeller housing including an expandable blood conduit that defines a blood lumen between an inflow region and an outflow region;
at least one impeller disposed at least partially within the blood lumen;
a sensor wire secured to the expandable impeller housing and extending from a proximal end of the expandable impeller housing to a distal end of the expandable impeller housing, wherein the sensor wire extends proximally from the expandable impeller housing and is in communication with a proximal region of the blood pump that is positioned to remain outside of a patient when the impeller is operated;
a distal sensor coupled to the sensor wire and disposed distal to a distal end of the expandable blood conduit; and
a proximal sensor disposed near the outflow region.

26. A catheter blood pump, comprising:
an elongate shaft;
an expandable pump portion extending distally from the elongate shaft, the pump portion including:
an expandable impeller housing including an expandable blood conduit that defines a blood lumen between an inflow region and an outflow region;

at least one impeller disposed at least partially within the blood lumen;

a fiber optic sensor wire secured to the expandable impeller housing and extending from a proximal end of the expandable impeller housing to a distal end of the expandable impeller housing;

a distal sensor coupled to the fiber optic sensor wire and disposed distal to a distal end of the expandable blood conduit; and a proximal sensor disposed near the outflow region.

27. A catheter blood pump, comprising:

an elongate shaft;

an expandable pump portion extending distally from the elongate shaft, the pump portion including:

an expandable impeller housing including an expandable blood conduit that defines a blood lumen between an inflow region and an outflow region, wherein the expandable impeller housing is stiffer in proximal and distal sections than in a central section in between the distal and proximal section;

at least one impeller disposed at least partially within the blood lumen;

a sensor wire secured to the expandable impeller housing and extending from a proximal end of the expandable impeller housing to a distal end of the expandable impeller housing;

a distal sensor coupled to the sensor wire and disposed distal to a distal end of the expandable blood conduit; and a proximal sensor disposed near the outflow region.

28. The catheter blood pump of claim 27, wherein the central section includes a helical configuration.

* * * * *